US012365109B2

(12) United States Patent
Harfst et al.

(10) Patent No.: US 12,365,109 B2
(45) Date of Patent: Jul. 22, 2025

(54) SAW CHAIN LINK WITH ONE OR MORE OVERSIZED RIVET HOLES

(71) Applicant: Oregon Tool, Inc., Portland, OR (US)

(72) Inventors: Michael D. Harfst, Milwaukie, OR (US); Christopher D. Seigneur, West Linn, OR (US)

(73) Assignee: Oregon Tool, Inc., Portland, OR (US)

( * ) Notice: Subject to any disclaimer, the term of this patent is extended or adjusted under 35 U.S.C. 154(b) by 66 days.

(21) Appl. No.: 17/678,821

(22) Filed: Feb. 23, 2022

(65) Prior Publication Data

US 2022/0219350 A1 Jul. 14, 2022

Related U.S. Application Data

(62) Division of application No. 15/406,602, filed on Jan. 13, 2017, now Pat. No. 11,273,573.

(60) Provisional application No. 62/278,331, filed on Jan. 13, 2016.

(51) Int. Cl.
*B27B 33/14* (2006.01)

(52) U.S. Cl.
CPC .......... *B27B 33/145* (2013.01); *B27B 33/141* (2013.01)

(58) Field of Classification Search
CPC ....... B27B 33/00; B27B 33/14; B27B 33/141; B27B 33/142; B27B 33/144; B27B 33/145
USPC .................................................... 83/830–834
See application file for complete search history.

(56) References Cited

U.S. PATENT DOCUMENTS 1,179,362 A * 4/1916 Wall ....................... B23Q 5/142 82/140
1,655,856 A * 1/1928 Bens ....................... B27B 33/14 83/832
2,165,524 A * 7/1939 Wolf .................. B27B 17/0008 30/387
2,508,784 A * 5/1950 Cox ...................... B27B 33/142 83/834
2,705,512 A 4/1955 Wolf
2,826,226 A * 3/1958 Donley ................. B27B 33/142 83/834
3,380,496 A * 4/1968 Hill ....................... B27B 33/142 76/112
3,421,313 A 1/1969 Harada et al.
3,545,508 A * 12/1970 Tupper .................. B27B 33/142 83/833
3,725,972 A 4/1973 McCabe
(Continued)

FOREIGN PATENT DOCUMENTS

CN 200981272 Y 11/2007
CN 100445057 C 12/2008
(Continued)

*Primary Examiner* — Adam J Eiseman
*Assistant Examiner* — Richard D Crosby, Jr.
(74) *Attorney, Agent, or Firm* — Foley & Lardner LLP

(57) ABSTRACT

Embodiments herein provide apparatuses, systems, and methods associated with a saw chain link having one or more oversized rivet holes. A rivet may be disposed in the oversized rivet hole and provide a clearance between the rivet and the edge of the oversized rivet hole that is about 0.010 inches or more. The clearance may permit the saw chain to move between two or more stable positions. The saw chain link may be a drive link, such as a cutter drive link or a bumper drive link. In some embodiments, the saw chain link may be a bi-directional saw chain link. Other embodiments may be described and claimed.

19 Claims, 29 Drawing Sheets

(56) References Cited

U.S. PATENT DOCUMENTS

| | | | | |
|---|---|---|---|---|
| 3,910,147 | A * | 10/1975 | Heyerdahl | B27B 33/145 30/381 |
| 3,945,288 | A * | 3/1976 | Olmr | B27B 33/141 83/834 |
| 4,118,995 | A | 10/1978 | Lanz et al. | |
| 4,202,219 | A * | 5/1980 | Weis | F16G 13/06 474/223 |
| 4,425,830 | A * | 1/1984 | Atkinson | B27B 33/141 83/834 |
| 4,524,519 | A * | 6/1985 | Muehling | B27G 19/003 83/DIG. 1 |
| 4,581,968 | A | 4/1986 | Gibson et al. | |
| 4,593,591 | A | 6/1986 | Beerens | |
| 4,754,549 | A | 7/1988 | Fischer et al. | |
| 4,756,221 | A | 7/1988 | Nitschmann et al. | |
| 4,873,903 | A * | 10/1989 | Harfst | B27B 33/14 83/834 |
| 4,967,630 | A * | 11/1990 | Burke | B27B 33/144 83/831 |
| 4,971,022 | A * | 11/1990 | Scott | B27B 17/12 125/21 |
| 4,979,416 | A | 12/1990 | Nitschmann | |
| 5,029,501 | A | 7/1991 | Smith | |
| 5,092,211 | A * | 3/1992 | Petrovich | B27B 33/142 83/834 |
| 5,123,400 | A * | 6/1992 | Edgerton | B27B 33/14 125/21 |
| 5,131,150 | A | 7/1992 | Muehling | |
| 5,172,619 | A * | 12/1992 | Kolve | B27B 33/142 83/13 |
| 5,209,216 | A * | 5/1993 | Mogi | B28D 1/125 83/831 |
| 5,226,404 | A * | 7/1993 | Mogi | B27B 33/144 83/810 |
| 6,138,658 | A * | 10/2000 | Bell | B28D 1/124 125/21 |
| 6,837,138 | B2 | 1/2005 | Mang | |
| 7,293,491 | B2 | 11/2007 | Harfst et al. | |
| 7,836,808 | B2 | 11/2010 | Szymanski | |
| 8,256,335 | B1 * | 9/2012 | Canon | B27B 33/14 83/832 |
| 8,578,694 | B2 | 11/2013 | Scott | |
| 8,602,015 | B2 * | 12/2013 | Michelon | B28D 1/124 125/21 |
| 9,027,451 | B2 | 5/2015 | Goettel | |
| 9,038,519 | B2 | 5/2015 | Goettel et al. | |
| 9,168,671 | B2 * | 10/2015 | Englund | B27B 33/14 |
| 9,561,600 | B2 | 2/2017 | Dröβler et al. | |
| 9,610,702 | B2 | 4/2017 | Hutsell | |
| 9,744,686 | B2 * | 8/2017 | Engelfried | B23D 65/00 |
| 9,757,808 | B2 | 9/2017 | Harfst et al. | |
| 9,895,825 | B2 | 2/2018 | Gerlach | |
| 10,384,367 | B2 * | 8/2019 | Engelfried | B27B 33/141 |
| 10,406,715 | B2 | 9/2019 | Harfst et al. | |
| 10,456,946 | B2 * | 10/2019 | Lux | B27B 33/142 |
| 11,247,363 | B2 * | 2/2022 | Seigneur | B27B 33/14 |
| 2002/0040841 | A1 | 4/2002 | Winkelman et al. | |
| 2003/0167895 | A1 | 9/2003 | Mang | |
| 2005/0115379 | A1 | 6/2005 | Schulz et al. | |
| 2007/0124946 | A1 | 6/2007 | Seigneur et al. | |
| 2008/0110316 | A1 | 5/2008 | Harfst | |
| 2008/0110317 | A1 | 5/2008 | Osborne et al. | |
| 2013/0118144 | A1 | 5/2013 | Scott | |
| 2014/0260875 | A1 * | 9/2014 | Harfst | B27B 33/14 76/112 |
| 2015/0075349 | A1 * | 3/2015 | Bozic | B27B 33/142 83/830 |
| 2015/0273722 | A1 * | 10/2015 | Madson | B23D 57/023 30/373 |
| 2016/0136837 | A1 | 5/2016 | Szymanski | |
| 2016/0169324 | A1 | 6/2016 | Wu | |
| 2017/0197327 | A1 | 7/2017 | Harfst et al. | |
| 2020/0316811 | A1 * | 10/2020 | Hodgkinson | B27B 33/142 |

FOREIGN PATENT DOCUMENTS

| | | | |
|---|---|---|---|
| CN | 101808789 | A | 8/2010 |
| CN | 105073357 | A | 11/2015 |
| CN | 105073358 | A | 11/2015 |
| DE | 1552691 | A1 | 5/1970 |
| DE | 1552690 | A1 | 8/1970 |
| SU | 512912 | A1 | 5/1976 |
| WO | WO2014143135 | A1 | 9/2014 |
| WO | WO2014143136 | A1 | 9/2014 |

* cited by examiner

SAW CHAIN LINK WITH ONE OR MORE OVERSIZED RIVET HOLES

CROSS REFERENCE TO RELATED APPLICATIONS

The present application claims priority to co-pending U.S. patent application Ser. No. 15/406,602, filed Jan. 13, 2017, which in turn claims priority of U.S. Provisional Patent Application No. 62/278,331, filed Jan. 13, 2016, both of which are entitled "Saw Chain Link with One or More Oversized Rivet Holes," and both of which are incorporated herein by reference in their entirety for all purposes except for those sections, if any, that are inconsistent with this specification.

TECHNICAL FIELD

Embodiments herein relate to the field of saw chain, and, more specifically, to a saw chain link with one or more oversized rivet holes.

BACKGROUND

Saw chains for chainsaws typically include a plurality of links, such as cutter links, drive links, and tie straps, coupled to one another by rivets. The rivets are disposed in rivet holes of one or more of the links.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1A:
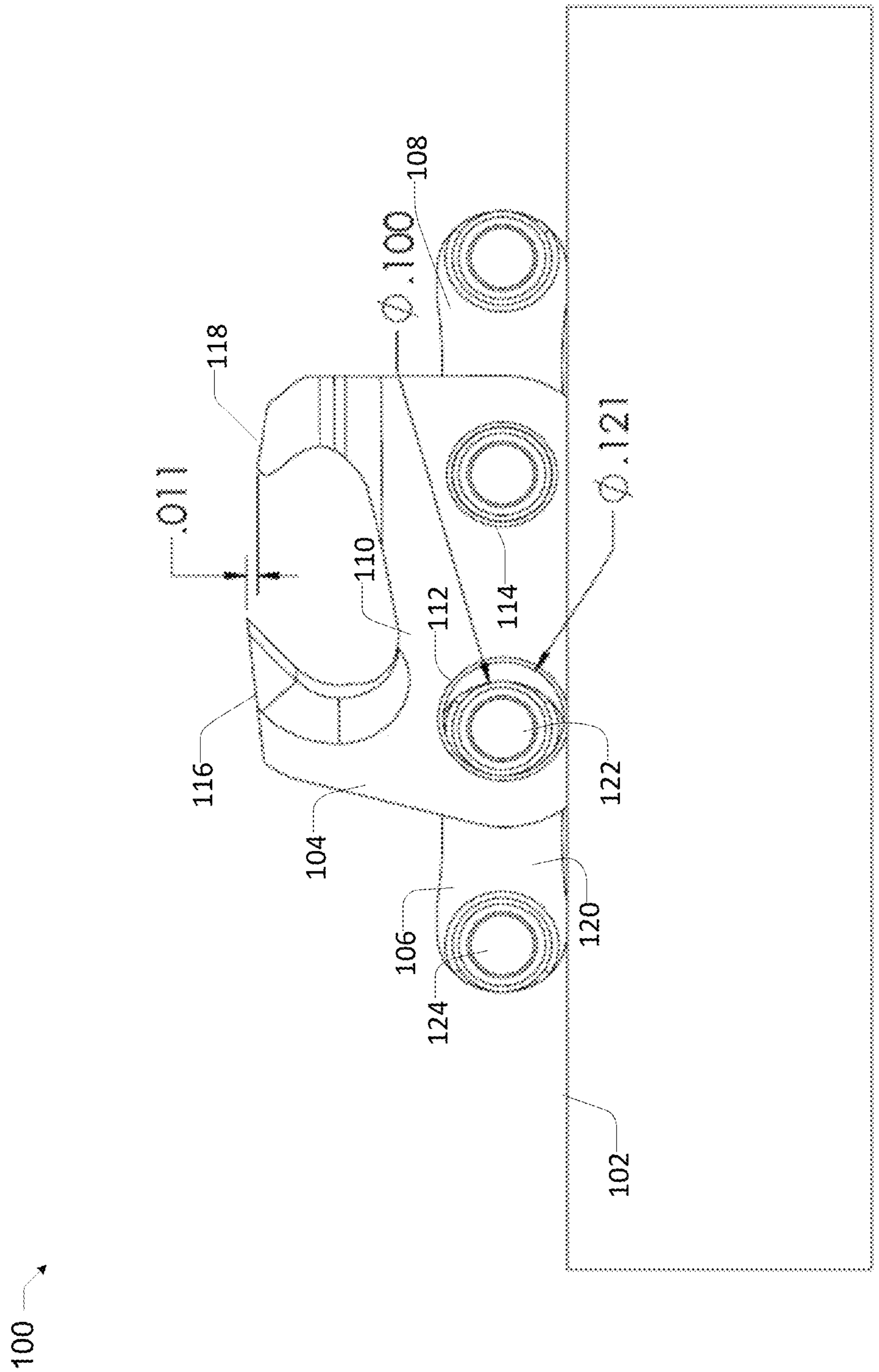
FIG. 1A illustrates a front view of a saw chain on a guide bar, the saw chain including a cutter drive link with an oversized rivet hole, and the cutter drive link positioned in a first orientation, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide an apparatus, system, and method for a saw chain link with one or more oversized rivet holes. Embodiments further provide a saw chain that includes a plurality of links coupled to one another by rivets. The links may include one or more links that include one or more oversized rivet holes with rivets disposed in the respective oversized rivet holes. For example, a link may include a body with two rivet holes (e.g., a first rivet hole and a second rivet hole) through the body. A rivet may be disposed in each rivet hole to couple the link to one or more adjacent and/or opposing links in the saw chain. One or more of the rivet holes may be oversized rivet holes. The term "oversized" means that the rivet hole and corresponding rivet may provide a clearance between the rivet and the edge of the rivet hole, wherein the rivet hole is thus larger than the standard size rivet hole. The clearance may allow for relative movement of the link with respect to the rivet. For example, the clearance in some embodiments may be about 0.010 inches or more, such as about 0.020 inches. For a saw chain with a pitch (e.g., distance between the centers of adjacent rivet holes) of 0.75 inches, the maximum clearance may be about 0.25 inches. Other embodiments may use another suitable clearance.

In various embodiments, the clearance between the rivet and the oversized rivet hole may allow the link to switch between different stable positions based on one or more conditions. A "stable position" is a position that the link maintains relative to the rivet and/or neighboring links so long as the one or more conditions are met. The oversized rivet may switch between the different stable positions while under tension in the saw chain, e.g., while the saw chain is connected to itself to form an endless loop on a guide bar. As further discussed below, the one or more conditions may include, for example, whether the link is under load (e.g., from a workpiece, such as wood, that is being cut by the saw chain), and/or whether the link is traversing an elongate portion of the guide bar or an end of the guide bar (e.g., a sprocket or a non-sprocket end).

In various embodiments, the saw chain may be configured to be driven on a guide bar of a chain saw or a mechanized tree harvester. The guide bar may extend from a body of the chain saw and may generally include a pair of elongate portions running from a proximal end of the guide bar (closer to the body) to a distal end of the guide bar (further from the body). In some embodiments, the elongate portion may include a pair of rails, with a groove disposed between the rails. The elongate portions may be substantially straight or may be curved. The elongate portions may be coupled together by curved portions at the proximal and distal ends of the guide bar to form an endless loop. The curved portions may have a sharper curvature than the elongate portions.

The guide bar may further include a sprocket at the proximal end and/or distal end to drive the saw chain around the ends (e.g., curved portions) of the guide bar. For example, the guide bar may include a drive sprocket at the proximal end of the guide bar and a nose sprocket at the distal end of the guide bar. The sprocket may include a spur with a plurality of pockets to engage respective links of the saw chain. In some embodiments, the sprocket may further include a pair of rims with outer edges that define rails. The spur may be sandwiched between the pair of rims. Other embodiments of the sprocket may not include rims.

In various embodiments, as discussed above, the saw chain may include a plurality of links coupled to one another in a chain. For example, the saw chain may include one or more cutter links, drive links, and/or tie straps. The cutter links may include a sharpened cutting edge for cutting a workpiece (e.g., wood). In some embodiments, the cutter links may further include a depth gauge to control a depth of cut of the cutter link. For example, the depth gauge may be disposed in front of the cutting element (e.g., in the direction of travel of the saw chain).

In various embodiments, the saw chain may include left side links, right side links, and center links. The left side links may ride on a first rail (e.g., left rail) of the guide bar, and the right side links may ride on a second rail (e.g., right rail) of the guide bar. The center links may ride in the groove of the guide bar between the rails. Additionally, the center links may be disposed in a pocket of the sprocket as the center links traverse the sprocket.

In various embodiments, the tie straps may be left side links or right side links, and the drive links may be center links. The drive links may include a tang that extends downward from a body of the drive link to ride in the groove of the guide bar and/or engage a pocket of the sprocket.

In some embodiments, the cutter links may be integrated into a tie strap. Such a link may be referred to as a cutter tie strap. The cutter tie strap may be a side link configured to ride on a left or right rail of the guide bar.

Additionally, or alternatively, some embodiments may provide a saw chain including cutter links integrated into a drive link. Such a link may be referred to as a cutter drive link. The cutter drive link may include a body with a tang extending downward from the body, and a cutting element and depth gauge extending upward from the body. Some embodiments may provide a saw chain including a plurality of cutter drive links coupled to one another by tie straps. For example, in some embodiments, the saw chain may include only cutter drive links, tie straps, and rivets.

In some embodiments, one or more of the drive links may be bumper drive links. The bumper drive links may include a bumper portion that extends upward from the body that is designed to extend radially as the bumper drive link traverses one or more of the sprockets. The radial extension of the bumper portion may prevent or reduce kickback of the saw chain during nose cuts (when the nose end of the chain saw is used to cut a workpiece).

In some embodiments, one or more of the tie straps may include one or more integrated rivets that extend from the body of the tie strap. Such a link may be referred to as a tie rivet. In some embodiments, the tie rivet may include two integrated rivets to engage with respective rivet holes in an opposing tie strap. In other embodiments, the tie rivet may include one integrated rivet and one rivet hole, and may engage with an opposing tie strap that also includes one integrated rivet and one rivet hole, such that the two tie straps are complementary.

Furthermore, in some embodiments, the saw chain may be a bi-directional saw chain that can be used in two orientations on the guide bar. For example, the saw chain may be used in a first orientation in which the first rivet hole of the drive links is in the forward direction (e.g., ahead of the second rivet hole in the direction of travel of the saw chain), and may also be used in a second orientation in which the second rivet hole of the drive links is in the forward direction (e.g., ahead of the first rivet hole in the direction of travel). The bi-directional saw chain may be used for a while in the first orientation, and then flipped around and used for a while in the second orientation. Thus, the bi-directional saw chain may provide an extended useful life compared with saw chains that are only usable in one direction.

In various embodiments, the bi-directional saw chain may include cutter links that have a first cutting element to perform cuts when the saw chain is in the first orientation and a second cutting element to perform cuts when the saw chain is in the second orientation. The second cutting element may not cut the workpiece when the saw chain is in the first orientation, and the first cutting element may not cut the workpiece with the saw chain is in the second orientation. Cutter links with first and second cutting elements as described above may be referred to as bi-directional cutter links.

In other embodiments, a bi-directional chain may include different cutter links (e.g., cutter drive links) that are oriented in opposite directions, to perform cuts when the chain travels in opposite directions. That is, one set of cutter links of the bi-directional chain may perform cuts when the bi-directional chain travels in a first direction, and another set of cutter links of the bi-directional chain may perform cuts when the bi-directional chain travels in a second direction opposite the first direction. One or more (e.g., all) of the cutter links may include one or more oversized rivet holes as described herein.

As discussed above, one or more of the links of the saw chain may include one or more oversized rivet holes. For example, one or more of the drive links may include one or more oversized rivet holes. The drive links with one or more oversized rivet holes may be, for example, cutter drive links and/or bumper drive links. Alternatively, one or more of the side links, such as one or more cutter tie straps, may include one or more undersized rivet flanges.

In some embodiments, the link may include a first rivet hole that is an oversized rivet hole and a second rivet hole that is a normal (standard) rivet hole. The oversized rivet hole may provide a first clearance between the edge of the oversized rivet hole and a first rivet disposed in the oversized rivet hole that is greater than a second clearance between the edge of the normal rivet hole and a second rivet disposed in the normal rivet hole. For example, the second clearance may be about 0.002 inches, and the first clearance may be about 0.010 inches or more, such as about 0.020 inches.

In some embodiments, a diameter of the oversized rivet hole may be larger than a diameter of the normal rivet hole. The first and second rivets may have respective flanges that may be disposed in the oversized rivet hole and normal rivet hole, respectively. In some embodiments, the first and second rivets may be the same size (e.g., may have flanges of the same diameter). Alternatively, the flange of the first rivet may have a diameter that is less than a diameter of the flange of the second rivet. The rivets with different diameter flanges may be used with rivet holes of the same diameter (with the rivet hole with the smaller diameter rivet corresponding to the oversized rivet hole) or with rivet holes of different diameters.

In some embodiments, a cutter drive link may include an oversized rivet hole below the cutting element, and a normal rivet hole below the depth gauge. The oversized rivet hole may, for example, be disposed behind the normal rivet hole with respect to the direction of travel of the link. The oversized rivet hole may cause the cutter drive link to rotate when a load is applied to the cutter drive link (e.g., by a workpiece that is being cut) so that a difference between a height of the cutter element (relative to the guide bar) and a height of the depth gauge is less when the load is applied than when the load is not applied.

Figure 1B:
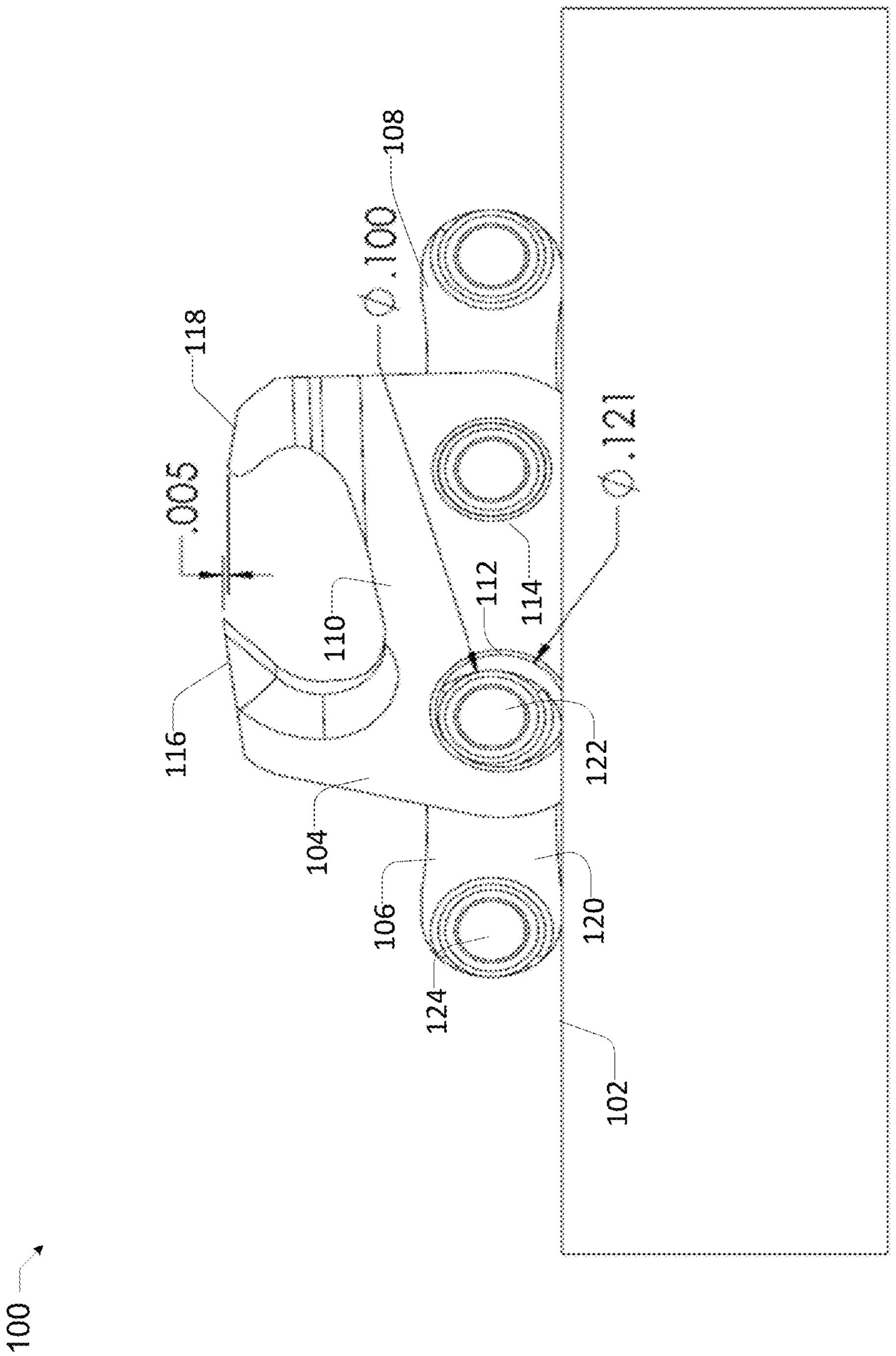
FIG. 1B illustrates a front view of the saw chain of FIG. 1A, with the cutter drive link in a second orientation, in accordance with various embodiments.

For example, FIGS. 1A and 1B illustrate a portion of a saw chain 100 disposed on an elongate portion of a guide bar 102. The saw chain 100 includes a cutter drive link 104, a tie rivet 106, and a tie rivet 108. FIG. 1A shows the saw chain 100 when the cutter drive link 104 is not subject to a load, and FIG. 1B shows the saw chain 100 when a load is applied to the cutter drive link 104.

The cutter drive link 104 includes a body 110 with an oversized rivet hole 112 and a normal rivet hole 114 disposed through the body 110. The oversized rivet hole 112 is disposed behind the normal rivet hole 114 with respect to a direction of travel of the saw chain 100. The cutter drive link 104 further includes a cutting element 116 that extends upward from the body 110 above the oversized rivet hole 112. Additionally, the cutter drive link 104 includes a depth gauge 118 that extends upward from the body 110 above the normal rivet hole 114.

In various embodiments, the tie rivet 106 includes a body 120, and a first rivet 122 and a second rivet 124 that extend from the body 120. For example, the first rivet 122 and second rivet 124 may extend approximately perpendicularly from an inner surface of the body 120. The first rivet 122 (e.g., a flange of the first rivet 122) may be disposed in the oversized rivet hole 112. A diameter of the first rivet 122 may be less than a diameter of the oversized rivet hole 112, thereby providing a clearance between the first rivet 122 and the oversized rivet hole 112. In one non-limiting example, the first rivet 122 may have a diameter of about 0.100 inches, and the oversized rivet hole 112 may have a diameter of about 0.121 inches. Accordingly, the clearance may be about 0.021 inches. In other embodiments, the first rivet 122 and oversized rivet hole 112 may have any suitable clearance, such as a clearance of 0.010 inch or more.

In various embodiments, the cutter drive link 104 may be in a first orientation, as shown in FIG. 1A, when the cutter drive link 104 is in an unengaged state (e.g., when the cutter drive link 104 is not subject to a cutting load). When the cutter drive link 104 is subjected to a cutting load during a cutting operation, the cutter drive link 104 may move to a second orientation, as shown in FIG. 1B. The cutter drive link 104 may stay in the second orientation during the cutting operation (e.g., when the cutting load is above a threshold). The position of the oversized rivet hole 122 and cutting element 116 may be lower with respect to the rail of the guide bar 102 and/or depth gauge 118 in the second orientation than in the first orientation.

For example, the cutter drive link 104 may have a depth gauge setting that corresponds to a difference in height between the cutting element 116 and the depth gauge 118 in a direction perpendicular to the direction of travel of the cutter drive link 104. The depth gauge setting may be greater in the first orientation than in the second orientation. For example, as shown in FIG. 1A, the depth gauge setting in the first orientation is about 0.011 inches, while, as shown in FIG. 1B, the depth gauge setting in the second orientation is about 0.05 inches.

The movement of the cutter drive link 104 from the first orientation to the second orientation when the cutting load is applied may provide one or more benefits. For example, the movement of the cutting element 116 when the cutting load is applied may reduce the vibration from cutting, thereby promoting a smooth cutting response. Additionally, or alternatively, as discussed above, the cutter drive link 104 may have a greater depth gauge setting in the first orientation when the cut is started, and a lower depth gauge setting in the second orientation during the cutting process. The greater depth gauge setting at the start of the cut may facilitate the initiation of the cut. Additionally, the lower depth gauge setting in the second orientation that is used during the cut may prevent the depth of cut from becoming too large and thereby overpowering the chain saw.

Furthermore, a cutter drive link with two normal rivet holes may not have a way to release the tension of the saw chain during a cut, thereby forcing the saw chain to stay engaged in the cut. The resulting chips formed by the saw chain may have a thickness of almost the full depth gauge setting and/or may be longer than chips formed by saw chains with cutter tie strap links (e.g., the chips may be up to an inch long instead of ¼ inch). By allowing the cutter drive link to rock (e.g., rotate) back during the cut, as is provided by the cutter drive link 104, the chips may be broken up sooner thereby producing smaller chips. The smaller chips may facilitate a clean cut and prevent or reduce clogging of the saw chain 100.

In some embodiments, the cutter drive link 104 may be held in one orientation on the nose of the guide bar (e.g., by the pocket of the sprocket), when the cutter drive link 104 is in the engaged state and the unengaged state (e.g., when the cutter drive link 104 is subjected to a load and not subjected to a load, respectively). Accordingly, the cutter drive link 104 may maintain stability for nose cuts (e.g., boring cuts).

Figure 2A:
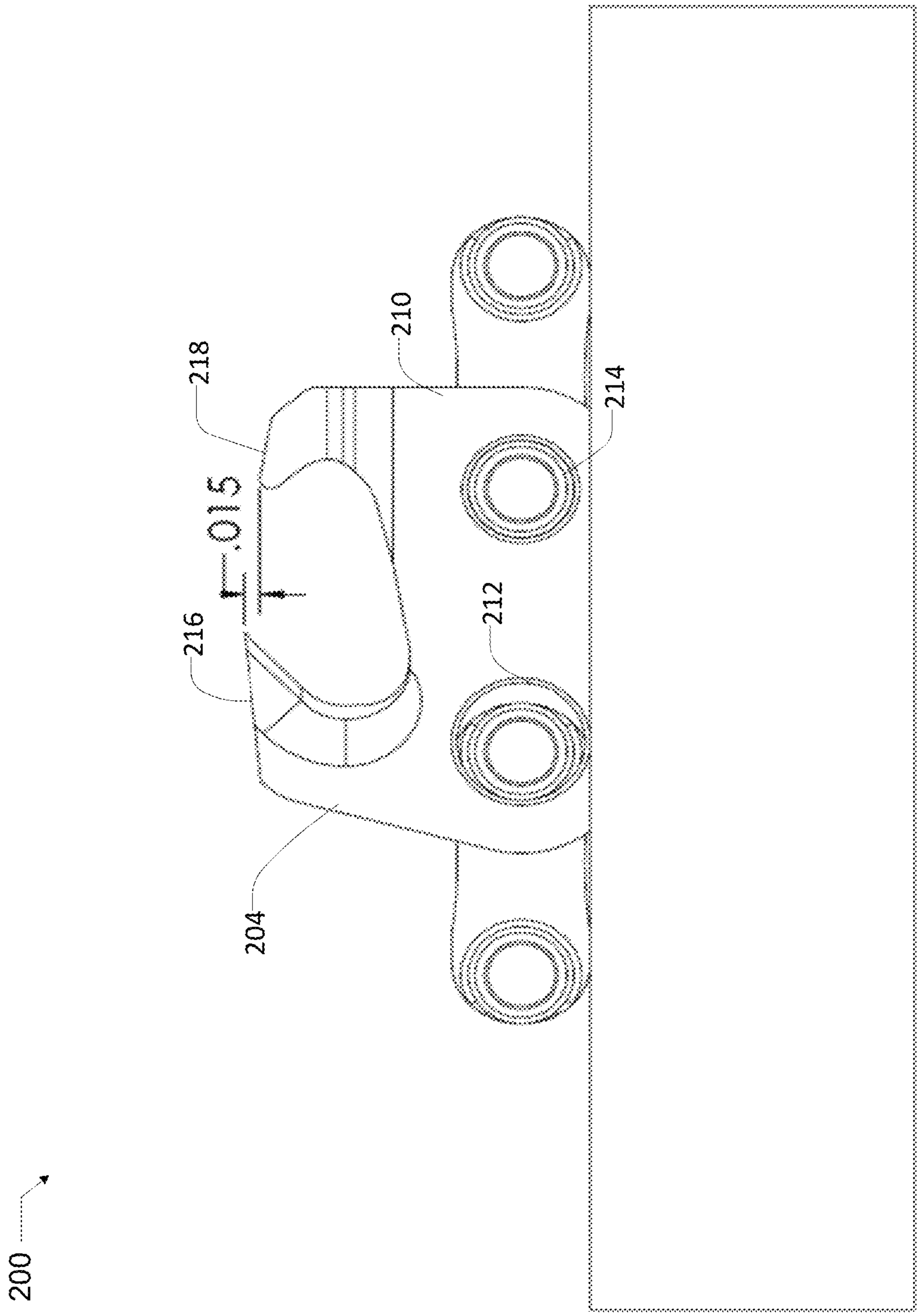
FIG. 2A illustrates a front view of a saw chain on a guide bar, with a cutter drive link of the saw chain including an oversized rivet hole and positioned in a first orientation, in accordance with various embodiments.
Figure 2B:
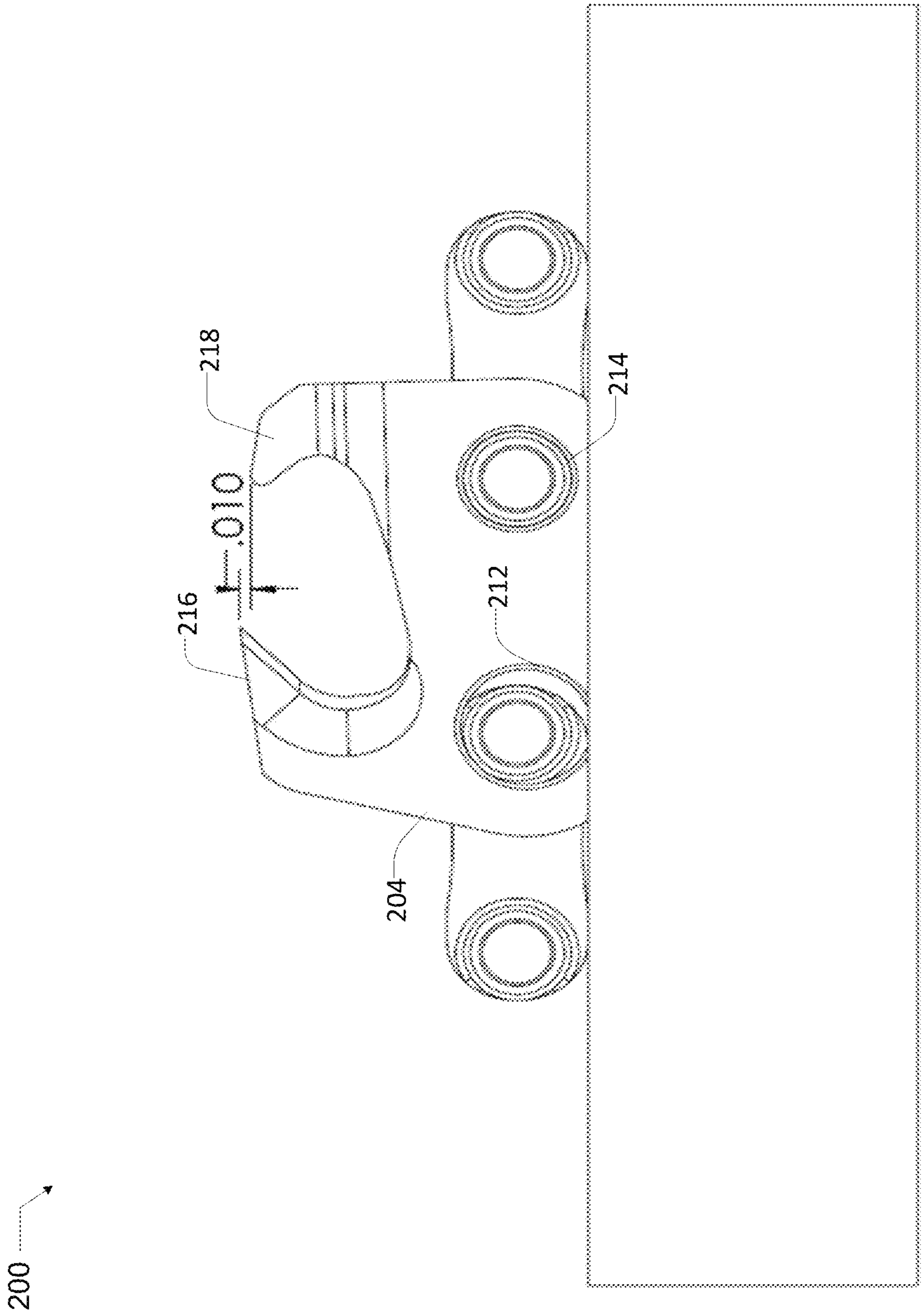
FIG. 2B illustrates a front view of the saw chain of FIG. 2A, with the cutter drive link in a second orientation, in accordance with various embodiments.

FIGS. 2A and 2B illustrate a saw chain 200 that is similar to the saw chain 100, but includes a cutter drive link 204 with a greater depth gauge setting than the cutter drive link 104. The cutter drive link 204 includes a body 210 with an oversized rivet hole 212 and a normal rivet hole 214 disposed through the body 210. The oversized rivet hole 212 is disposed behind the normal rivet hole 214 with respect to a direction of travel of the saw chain 200. The cutter drive link 204 further includes a cutting element 216 that extends upward from the body 210 above the oversized rivet hole 212. Additionally, the cutter drive link 204 includes a depth gauge 218 that extends upward from the body 210 above the normal rivet hole 214.

The cutter drive link 204 may be in a first orientation, as shown in FIG. 2A, when in an unengaged state (e.g., when no cutting load is applied). The cutter drive link 204 may be in a second orientation, as shown in FIG. 2B, when a cutting load is applied. As shown in FIG. 2A, the depth gauge setting of the cutter drive link 204 in the first orientation may be about 0.015 inches, and the depth gauge setting of the cutter drive link 204 in the second orientation may be about 0.010 inches. The depth gauge setting of the cutter drive link 204 in the first orientation may be greater than the depth gauge setting that would be used for a cutter drive link with two normal rivet holes. The oversized rivet hole 212 of the cutter drive link 204 allows the use of a greater depth gauge setting in the first orientation, since the depth gauge setting will be lower during the cutting operation. The greater depth gauge setting in the first orientation may facilitate initiation of the cut.

In some embodiments, the oversized rivet hole of the cutter drive link may have a non-circular cross-sectional shape. For example, the oversized rivet hole may have a cross-sectional shape that corresponds to a slanted oval, a kidney bean shape, a slot with substantially straight side walls and curved end walls, an arc-shaped slot, or another suitable shape. Additionally, in some embodiments, a movement axis of the oversized rivet hole may be disposed at an angle with respect to a direction of travel of the saw chain and/or a bar perpendicular line that is perpendicular to the bar contour below the oversized rivet hole. The movement axis may generally correspond to the path of travel of the rivet hole with respect to the rivet when the cutter drive link moves between the first orientation and the second orientation. The angled movement axis of the oversized rivet hole may cause the rivet to move horizontally between the first and second orientations. Accordingly, the distance between the adjacent links (e.g., tie straps) that are coupled to the cutter drive link by the rivets may change from the first orientation to the second orientation.

Figure 3:
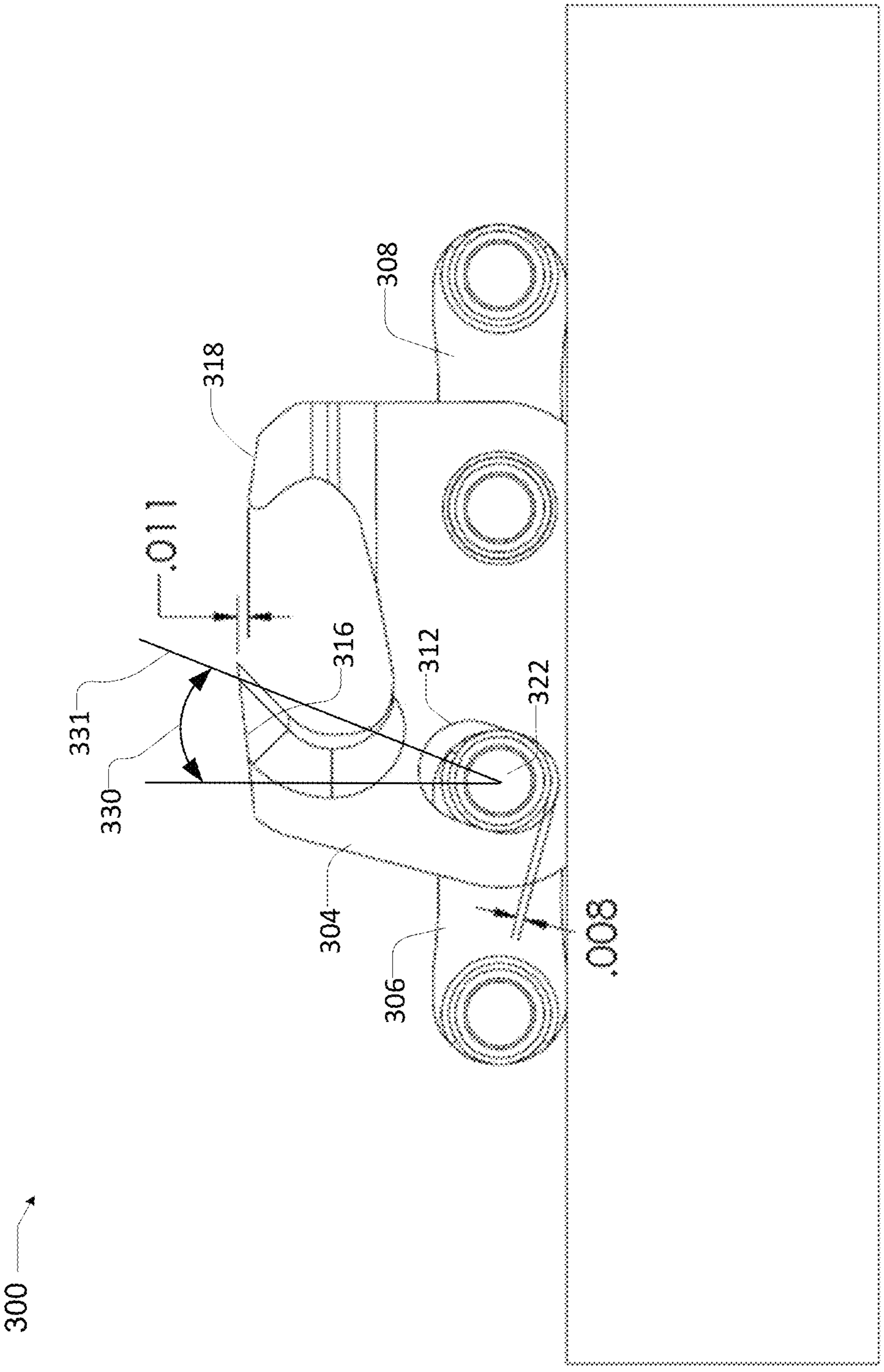
FIG. 3 illustrates a front view of a saw chain including a cutter drive link with an oversized rivet hole that has a cross-sectional shape corresponding to a slot, in accordance with various embodiments.

FIG. 3 illustrates a saw chain 300 in accordance with various embodiments. Saw chain 300 includes a cutter drive link 304 with an oversized rivet hole 312 that has a cross-sectional shape corresponding to a slot, with side walls that are substantially straight and end walls that are curved. In other embodiments, the side walls may also be curved (e.g., less severely than the end walls). A movement axis 331 of the oversized rivet hole 312 may be disposed at an angle 330 with respect to the direction of travel of the saw chain 300 and/or the bar perpendicular line. The movement axis 331 may generally correspond to the path of travel of the oversized rivet hole 312 with respect to the rivet 322, enabled by the clearance between the oversized rive hole 312 and the rivet 322. For example, the movement axis 331 may correspond to the long axis of the oversized rivet hole 312. FIG. 3 illustrates the saw chain 300 when the cutter drive link 304 is subjected to a cutting force (e.g., while cutting).

In various embodiments, the cutter drive link 304 may further include a cutting element 316 and a depth gauge 318. A rivet 322 of a tie strap 306 may be disposed in the oversized rivet hole 312. The cutter drive link 304 may move with respect to the rivet 322, e.g., when a cutting load is applied. For example, in an unengaged state (e.g., when no cutting load is applied), the rivet 322 may be disposed in a lower portion of the oversized rivet hole 312. In some embodiments, there may be a small gap between the lower boundary of the oversized rivet hole 312 and the rivet 322 during engagement as the cutting load and restoring force are balanced by the cutting element 316 moving downward to decrease the cutting load to match the chain tension induced restoring force. Tension in the chain causes a rivet 322 to come against the rear wall of angled oversized rivet hole 312 which is oriented at the angle 330. The chain tension acting against the rear wall at angle 330 creates a vertical restoring force. The position of the rivet 322 and the oversized rivet hole 312 shown in FIG. 3 may be one example of a stable cutting position in which the upper portion of the oversized rivet hole 312 is not driven to contact the rivet by the applied load.

When a cutting load is applied to the cutter drive link 304, the cutting element 316 may move so that the rivet 322 is disposed in an upper portion of the oversized rivet hole 312. The angled oversized rivet hole 312 may cause the rivet 322 to move in a horizontal direction between the first and second orientations. Accordingly, the distance between the tie strap 306 and an adjacent tie strap (e.g., tie strap 308) may be different in the first orientation than in the second orientation.

In various embodiments, the value of the angle of the rear wall of the oversized rivet hole 312 (e.g., the angle 330 of the movement axis 331) may determine the amount of restorative force that is provided by tension in the saw chain 300. The restorative force may correspond to the amount of force that pushes the cutter drive link 304 toward the first orientation that the cutter drive link 304 has in the unengaged state (e.g., the force that must be overcome by the cutting load to push the move the cutter drive link 304 to the second orientation). A higher value of the angle 330 (e.g., the more the oversized rivet hole 312 is angled from vertical) may provide more pitch change (e.g., change in the distance between adjacent links) per degree of rotation of the cutter drive link 304, and also thereby more tension change.

Figure 4A:
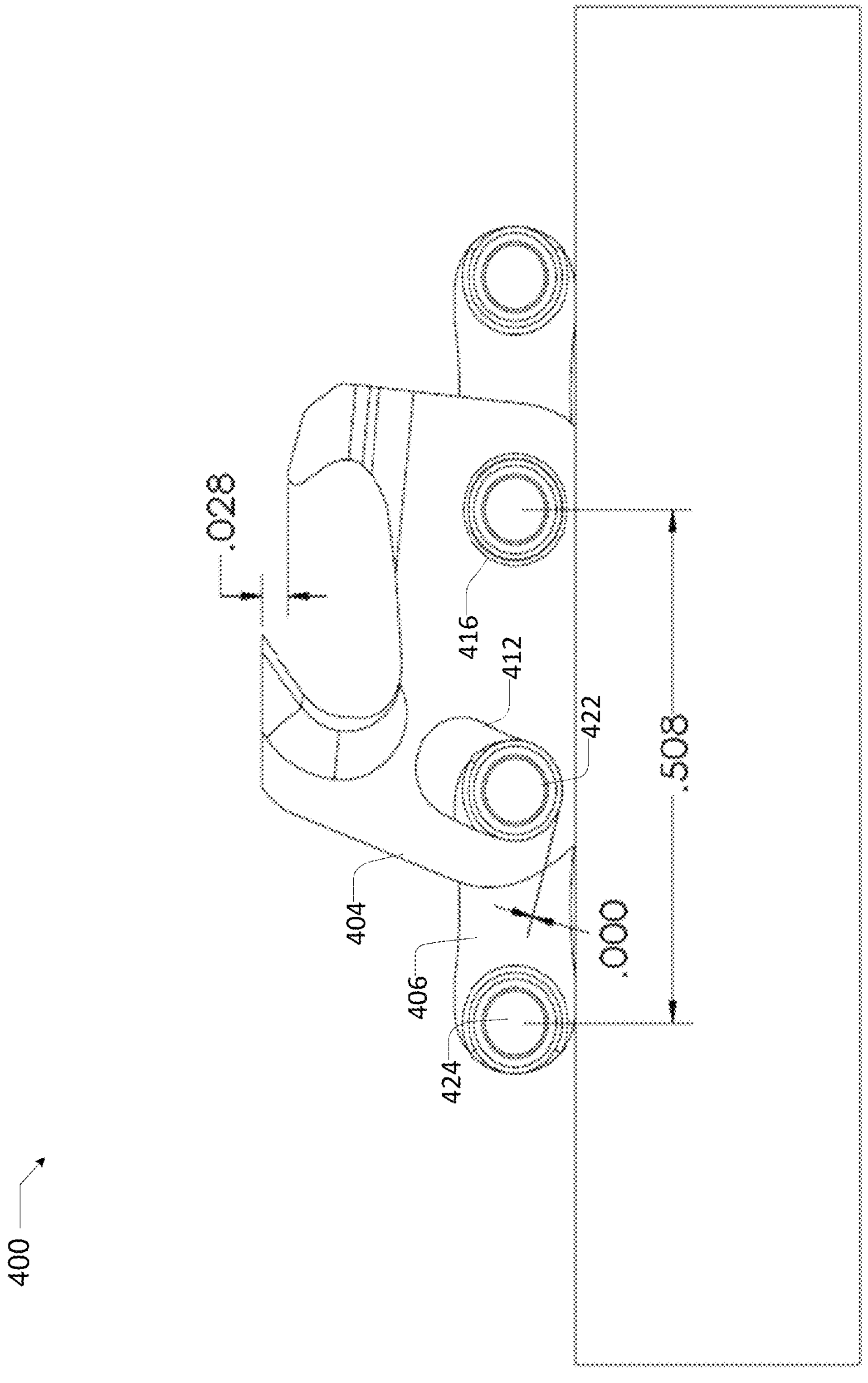
FIG. 4A illustrates a front view of a saw chain including a cutter drive link with an oversized rivet hole that has a cross-sectional shape corresponding to a curved slot and showing the cutter drive link in a first orientation, in accordance with various embodiments.
Figure 4B:
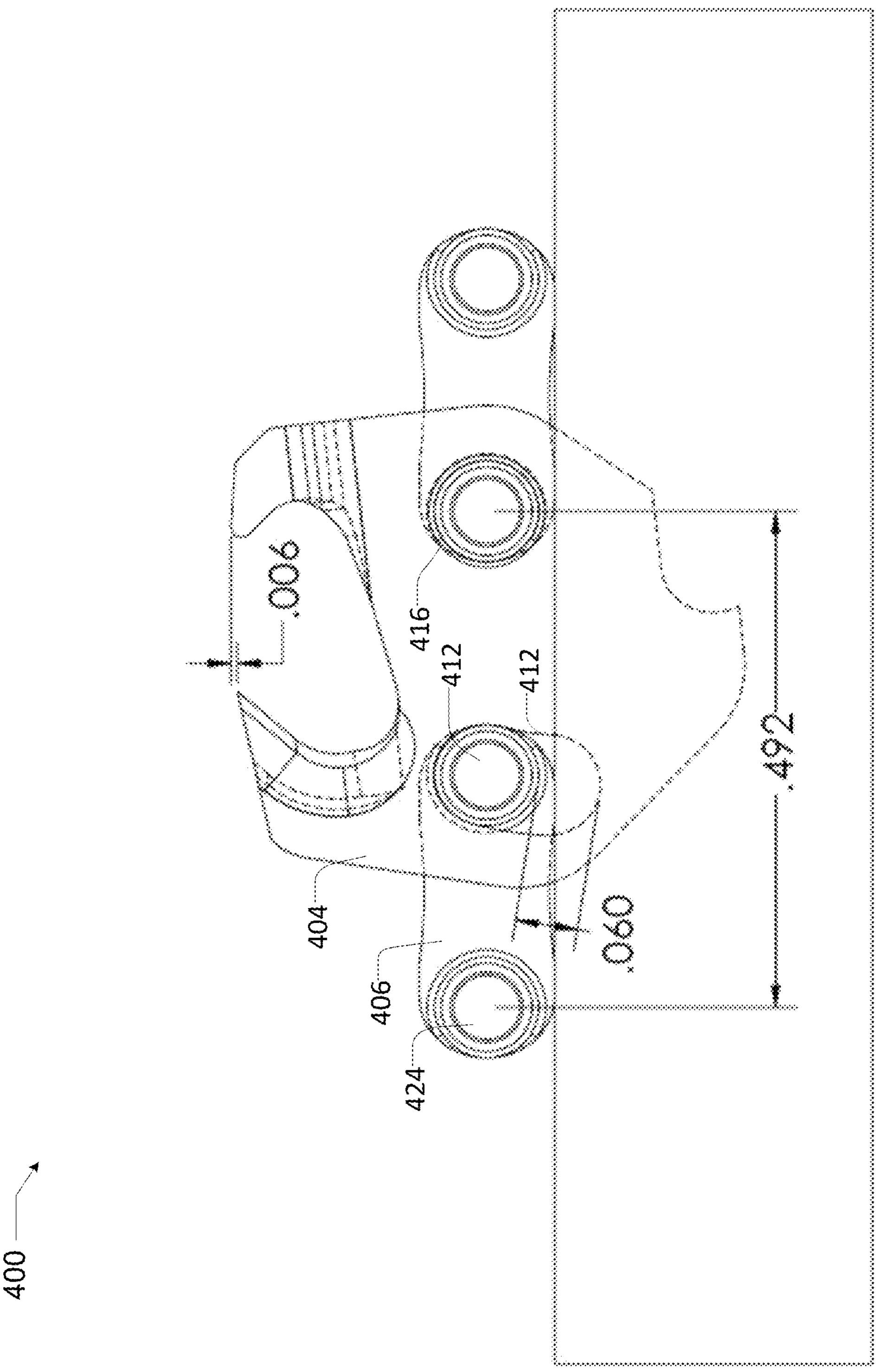
FIG. 4B illustrates a front view of the saw chain of FIG. 4A with the cutter drive link in a second orientation, in accordance with various embodiments.

FIGS. 4A and 4B illustrate a saw chain 400 that includes a cutter drive link 404 with an oversized rivet hole 412 that has a cross-sectional shape corresponding to a curved slot. A rivet 422 of a tie rivet 406 is disposed in the oversized rivet hole 412. FIG. 4A shows the cutter drive link 404 in a first orientation (e.g., when no cutting load is applied to the cutter drive link 404). FIG. 4B shows the cutter drive link 404 in a second orientation (e.g., when a cutting load or possibly a potentially damaging load is applied). In FIG. 4B the cutting element of the cutting element of the cutter drive link 404 is so reduced in height that the depth gauge stands higher. This orientation allows the cutter to move out of the way of rocks or metal parts so as to reduce damage to the cutting element.

As shown, a distance between a center of a rear rivet 424 of the tie rivet 406 and a center of the rivet (not shown) disposed in the rivet hole 416 of the cutter drive link 404 may be greater in the first orientation than in the second orientation. In one non-limiting example, as shown in FIGS. 4A and 4B, the distance may be about 0.508 inches in the first orientation and about 0.492 in the second orientation. The pitch change from the decreased distance in the second orientation may increase the restorative force to push the cutter drive link 404 to the first orientation when the cutting load is removed.

Figure 5A:
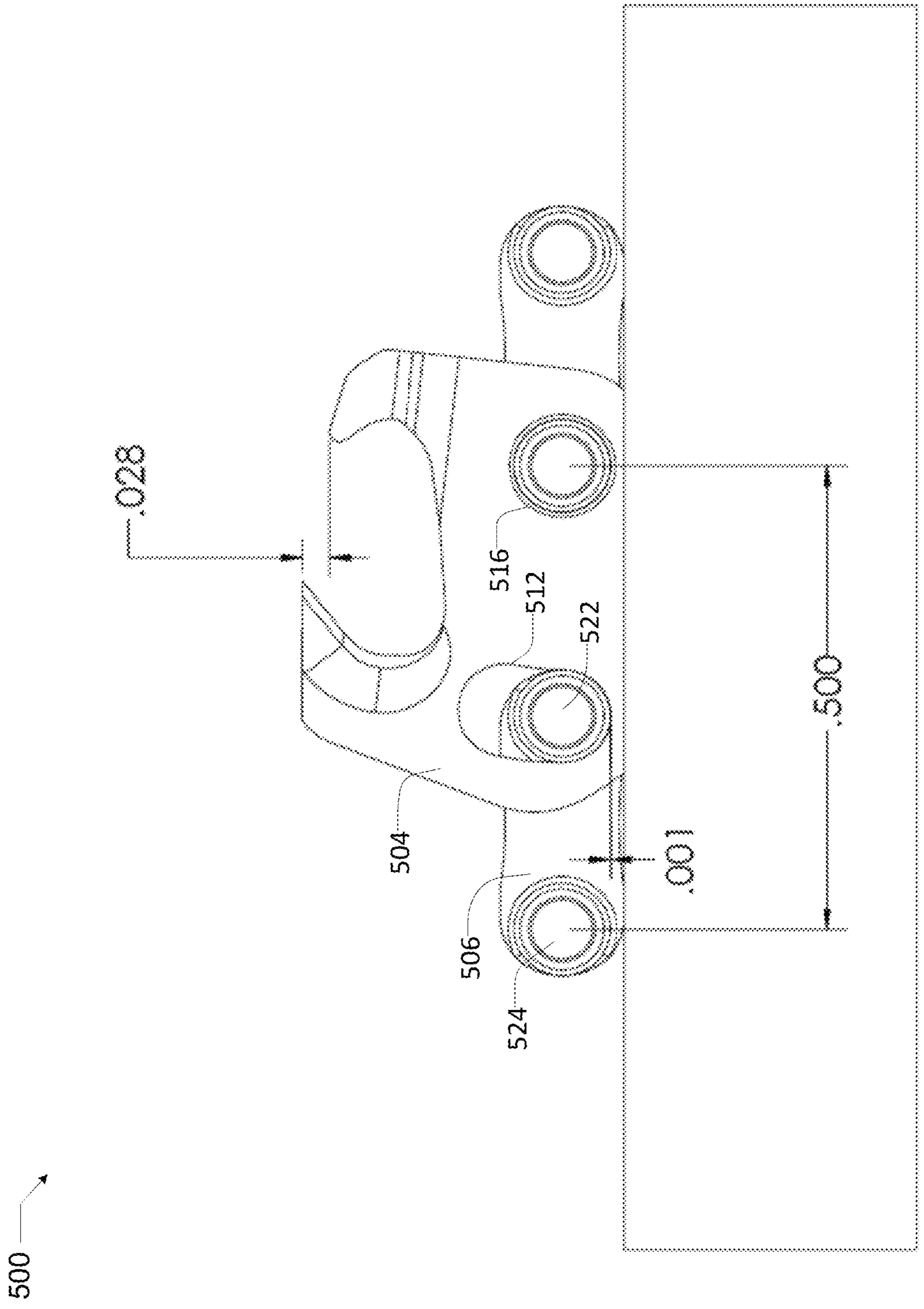
FIG. 5A illustrates a front view of a saw chain including a cutter drive link with an oversized rivet hole that has a cross-sectional shape corresponding to an arc-shaped slot and showing the cutter drive link in a first orientation, in accordance with various embodiments.
Figure 5B:
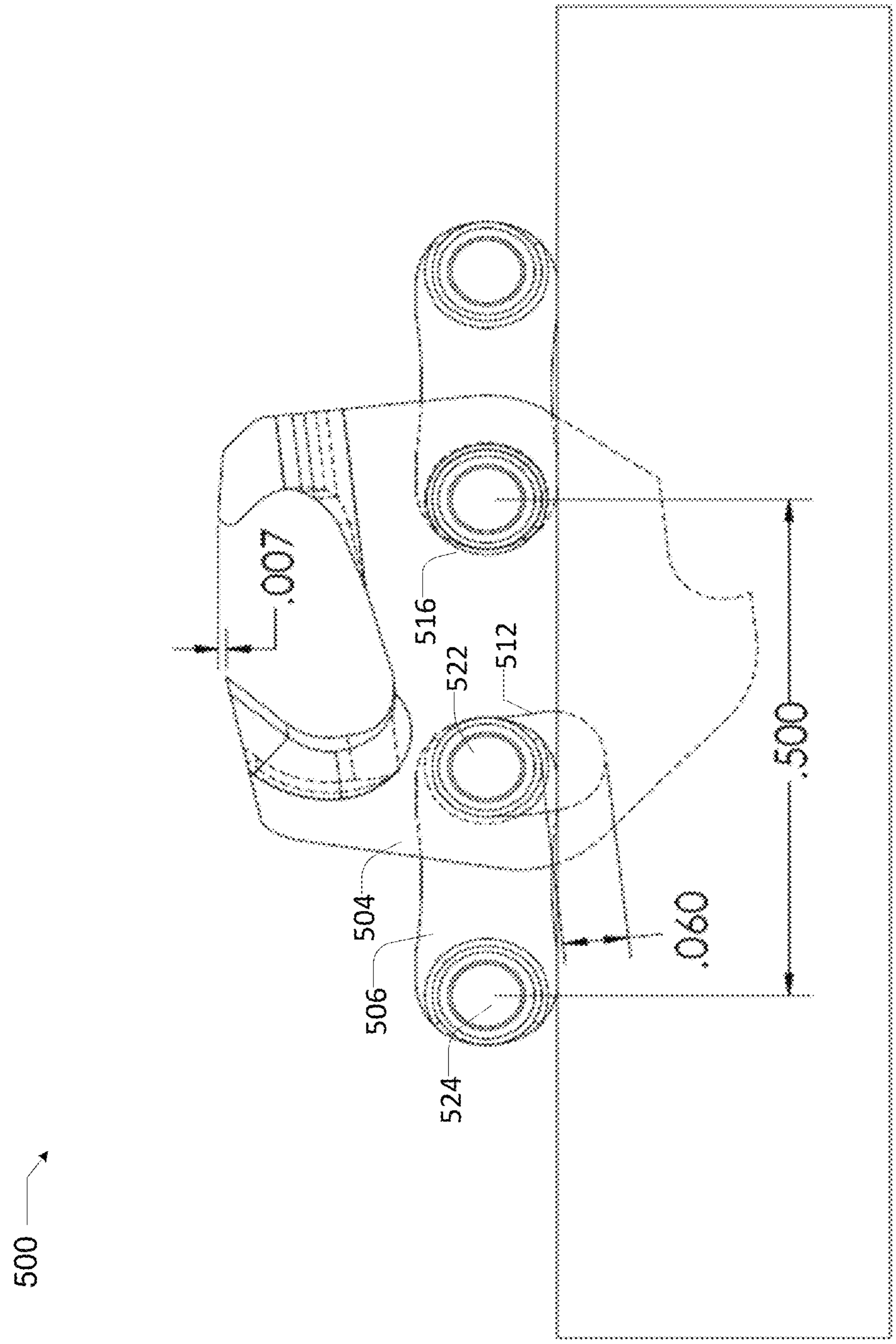
FIG. 5B illustrates a front view of the saw chain of FIG. 5A with the cutter drive link in a second orientation, in accordance with various embodiments.

Alternatively, in some embodiments, the oversized rivet hole may have a cross-sectional shape that corresponds to an arc-shaped slot so that there is no pitch change between the first orientation and the second orientation. For example, FIGS. 5A and 5B illustrate a saw chain 500 that includes a cutter drive link 504 with an oversized rivet hole 512 that has a cross-sectional shape corresponding to an arc-shaped slot that is concentric with the rivet hole 516 of the cutter drive link 504. A rivet 522 of a tie rivet 506 is disposed in the oversized rivet hole 512. FIG. 5A shows the cutter drive link 504 in a first orientation (e.g., when no cutting load is applied to the cutter drive link 504). FIG. 5B shows the cutter drive link 504 in a second orientation (e.g., when a cutting load or possibly a potentially damaging load is applied).

As shown, a distance between a center of a rear rivet 524 of the tie rivet 506 and a center of the rivet (not shown) disposed in the rivet hole 516 of the drive link 504 may be the same in the first orientation and in the second orientation. Accordingly, the cutter drive link 504 may change between the first orientation and the second orientation without changing the pitch and/or tension of the saw chain 500.

In other embodiments, the front rivet hole of the drive link may be the oversized rivet hole. For a cutter drive link with an oversized rivet hole as the front rivet hole, the depth gauge may move lower (e.g. away from the workpiece being cut) when a cutting load is applied to the cutter drive link. Such a cutter drive link may be used to prevent/reduce kickback (e.g., as the cutter drive link traverses the nose of a non-sprocket nose bar (a guide bar that does not include a sprocket on the nose)). Lowering the depth gauge of the cutter drive link may increase the heel interference of the cutter drive link, decrease the cutting edge relief angle (e.g., the angle of the top surface of the cutting element), and/or decrease the cutting edge engagement with the workpiece (e.g., wood). The heel of the cutter drive link may refer to the top rear portion of the cutting element. Heel interference may result from an orientation of the cutter drive link on the nose of the guide bar in which the heel of the cutting element extends further from the rail of the guide bar than the cutting edge. The wood may contact the heel first and the heel may prevent the cutting edge from cutting the wood.

Figure 6A:
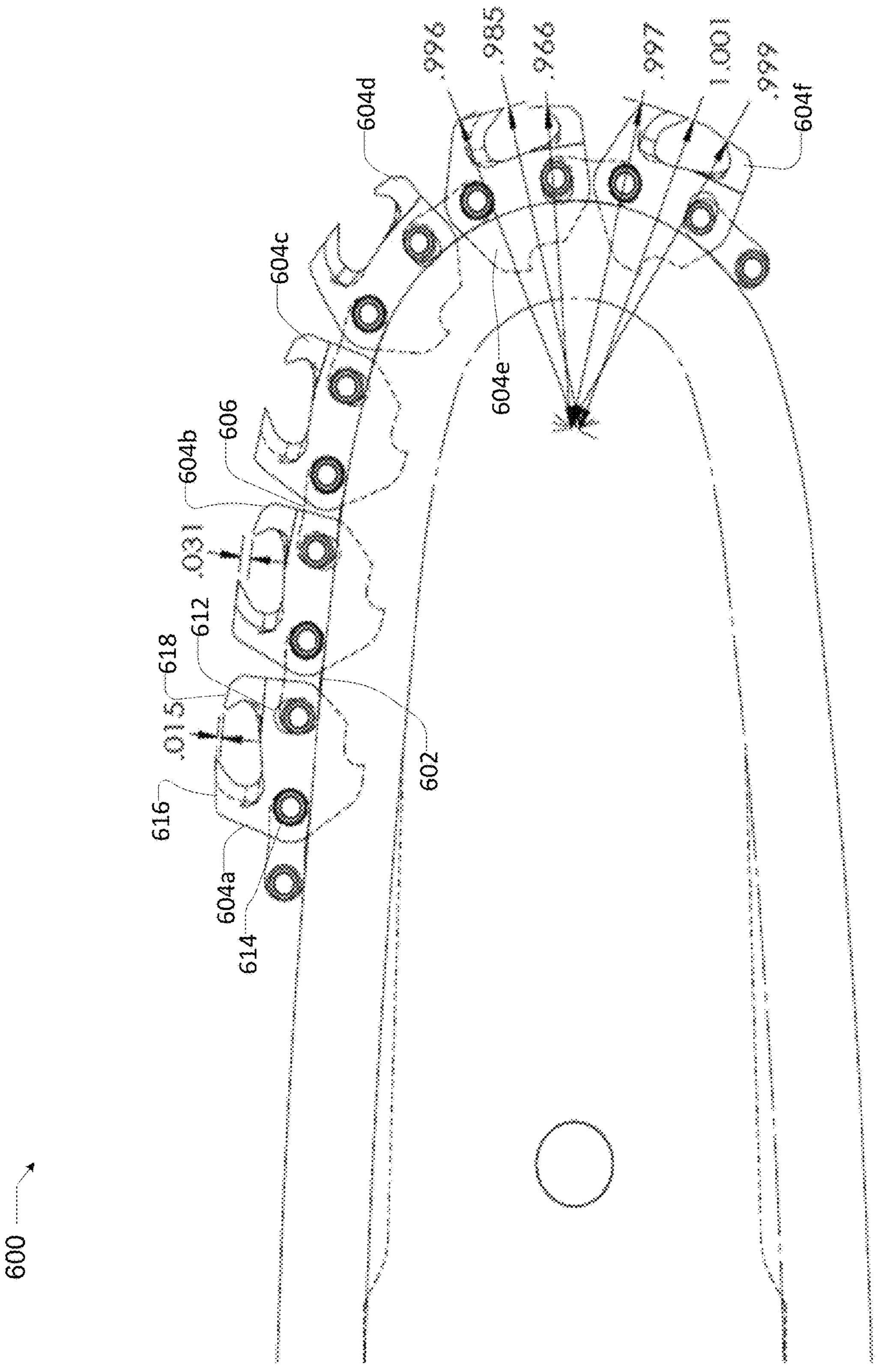
FIG. 6A illustrates a front view of a saw chain on a guide bar, the saw chain including cutter drive links with an oversized rivet hole, in accordance with various embodiments.

For example, FIG. 6A illustrates a saw chain 600 that includes cutter drive links 604*a-f* with an oversized rivet hole 612 as the front rivet hole, in accordance with various embodiments. The saw chain 600 includes a plurality of cutter drive links 604*a-f*, shown in FIG. 6A as they approach or traverse a nose of a guide bar 602. In some embodiments, the guide bar 602 may not include a nose sprocket on the nose of the guide bar. In other embodiments, the guide bar 602 may include a nose sprocket. In various embodiments, the cutter drive links 604*b* and 604*e* are shown while under a cutting load, and cutter drive links 604*a* and 604*f* are shown while not under a cutting load.

The cutter drive links 604*a-f* each include an oversized rivet hole 612, a normal rivet hole 614, a cutting element 616, and a depth gauge 618. The oversized rivet hole 612 is disposed below the depth gauge 618, and the normal rivet hole 614 is disposed below the cutting element 616. The saw chain 600 further includes a plurality of tie rivets 606 with integrated rivets that extend through the respective oversized rivet holes 612 and normal rivet holes 614 of the cutter drive links 604*a-f*. The opposing tie straps are not shown to allow the oversized rivet holes 612 and normal rivet holes 614 to be viewed.

In various embodiments, with the oversized rivet hole 612 disposed below the depth gauge 618, the depth gauge 618 may lower with respect to the cutting element 616 when the cutter drive link 604*a-f* when subjected to a load (e.g., from cutting engagement). The lowering of the depth gauge 618, when the chain is on the nose of the bar, may increase the heel interference of the cutter drive link 604*a-f*, decrease the cutting edge relief angle, and decrease the amount of engagement between the cutting edge and the workpiece (e.g., wood). This arrangement may be used to prevent or reduce kickback of the saw chain 600 as it traverses the nose of the guide bar 600.

Figure 6B:
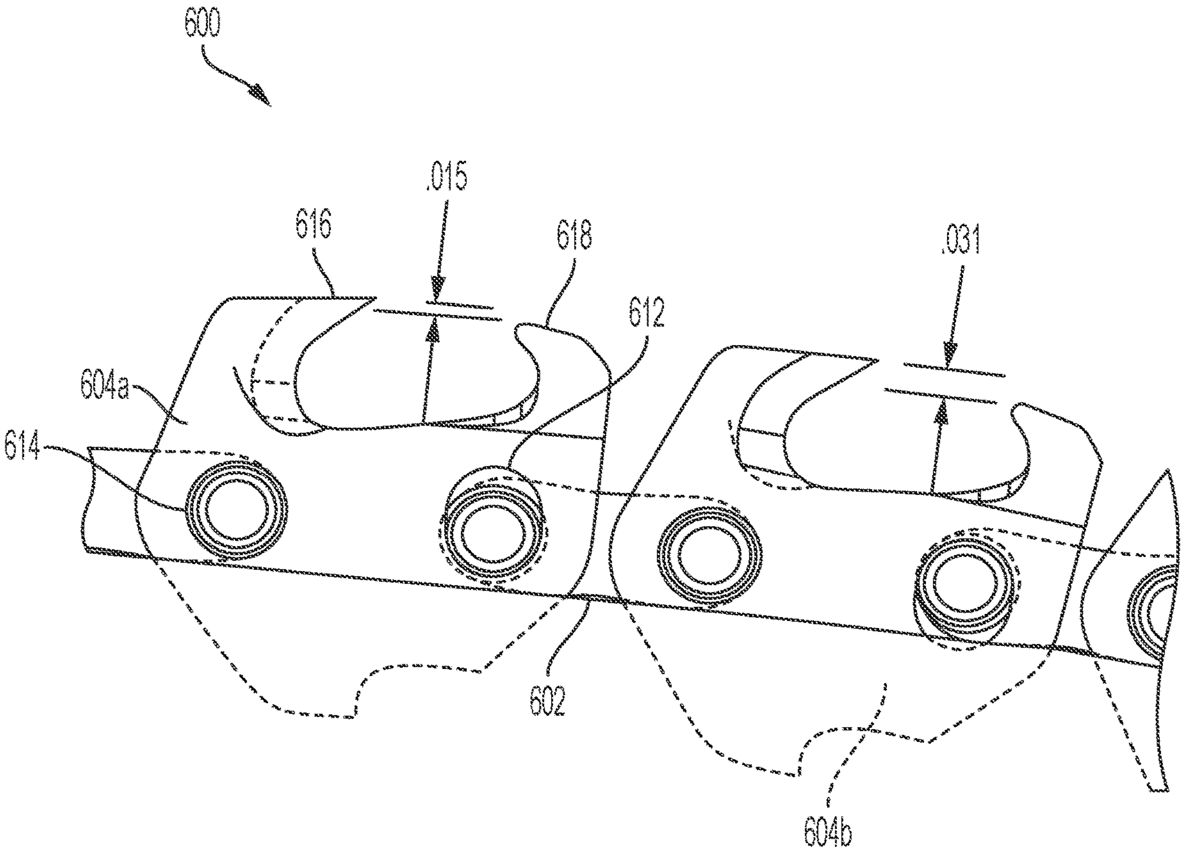
FIG. 6B illustrates a closer view of a portion of the saw chain of FIG. 6A.

FIG. 6B illustrates a close-up view of cutter drive links 604*a* and 604*b* that traverse the elongate portion of the guide bar 602. As shown, cutter drive link 604*b*, which is under a cutting load may be rotated with respect to cutter drive link 604*a* so that the depth gauge setting of cutter drive link 604*b* is greater than the depth gauge setting of cutter drive link 604*a* (e.g., 0.030 inches compared with 0.015 inches). Accordingly, the cutting load on the cutter drive link 604*b* may increase the depth of cut of the cutter drive link 604*b*.

Figure 6C:
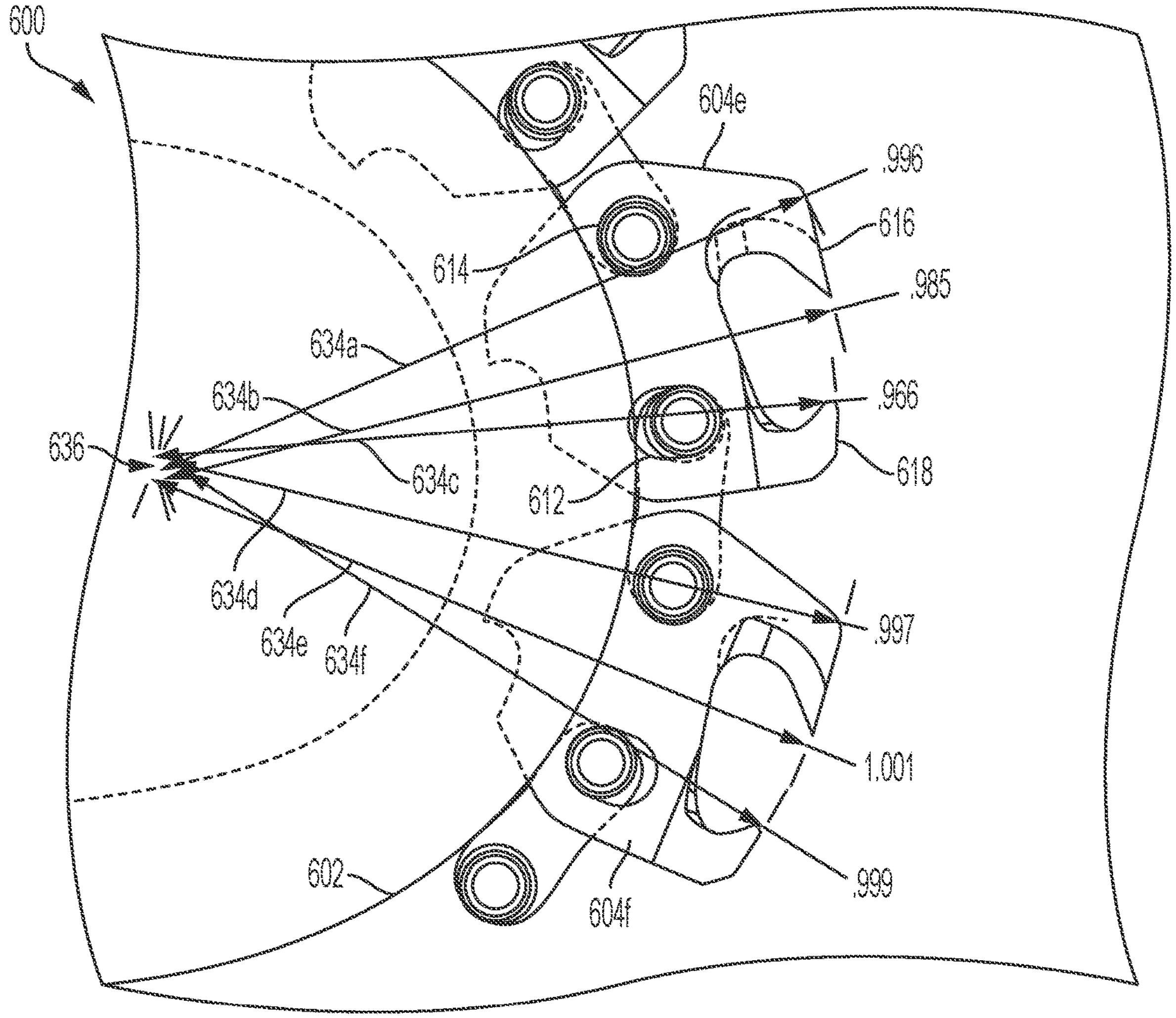
FIG. 6C illustrates a closer view of another portion of the saw chain of FIG. 6A.

FIG. 6C illustrates a close-up view of cutter drive links 604*e* and 604*f* to illustrate the potential movement of the depth gauge while the cutter drive links 604*e* and 604*f* traverse the nose of a guide bar 602 that does not include a nose sprocket. As discussed above, cutter drive link 604*e* is shown under a cutting load and cutter drive link 604*f* is shown not under a cutting load.

FIG. 6C also shows radial extension distances 634*a*, 634*b*, 634*c*, 634*d*, 634*e*, and 634*f*. The radial extension distance 634*a* is a distance from a center of rotation 636 of the chain around the bar nose to a rear portion (heel) of the cutting element 616 of the cutter drive link 604*e*, radial extension distance 634*b* is a distance from the center of rotation 636 to a front portion of the cutting element 616 of the cutter drive link 604*e*, and radial extension distance 634*c* is a distance from the center of rotation 636 to the depth gauge 618 of the cutter drive link 604*e* (e.g., to the most extended portion of the depth gauge 618 of cutter drive link 604*e*). Similarly, the radial extension distance 634*d* is a distance from the center of rotation 636 of the chain around the bar nose to a rear portion (heel) of the cutting element 616 of the cutter drive link 604*f*, radial extension distance 634*e* is a distance from the center of rotation 636 to a front portion of the cutting element 616 of the cutter drive link 604*f*, and radial extension distance 634*f* is a distance from the center of rotation 636 to the depth gauge 618 of the cutter drive link 604*f* (e.g., to the most extended portion of the depth gauge 618 of cutter drive link 604*f*).

As shown, for cutter drive link 604*e*, the radial extension distance 634*a* is greater than the radial extension distance 634*b*, and the radial extension distance 634*b* is greater than the radial extension distance 634*c*. In contrast, for cutter drive link 604*f*, the radial extension distance 634*d* is less than the radial extension distances 634*e* and 634*f*, and the radial extension distance 634*e* is greater than the radial extension distance 634*f*. Accordingly, the cutting load on the cutter drive link 604*e* results in increased heel interference for the cutter drive link 604*e* compared with the cutter drive link 604*f* (which is not under a cutting load). The heel of the cutter drive link 604*e* acts as a bumper so that the cutting edge of the cutting element 616 and the depth gauge 618 of the cutter drive link 604*e* do not contact the wood.

As discussed above, the change in the depth gauge setting and/or radial extension distances as the cutter drive links 604*a-f* may prevent or reduce kickback of the saw chain 600. Additionally, or alternatively, a similar arrangement may be used to orient the cutter drive links 604*a-f* on a sprocket (e.g., on the drive sprocket or nose sprocket) to facilitate sharpening of the cutter drive links 604*a-f*.

Figure 7:
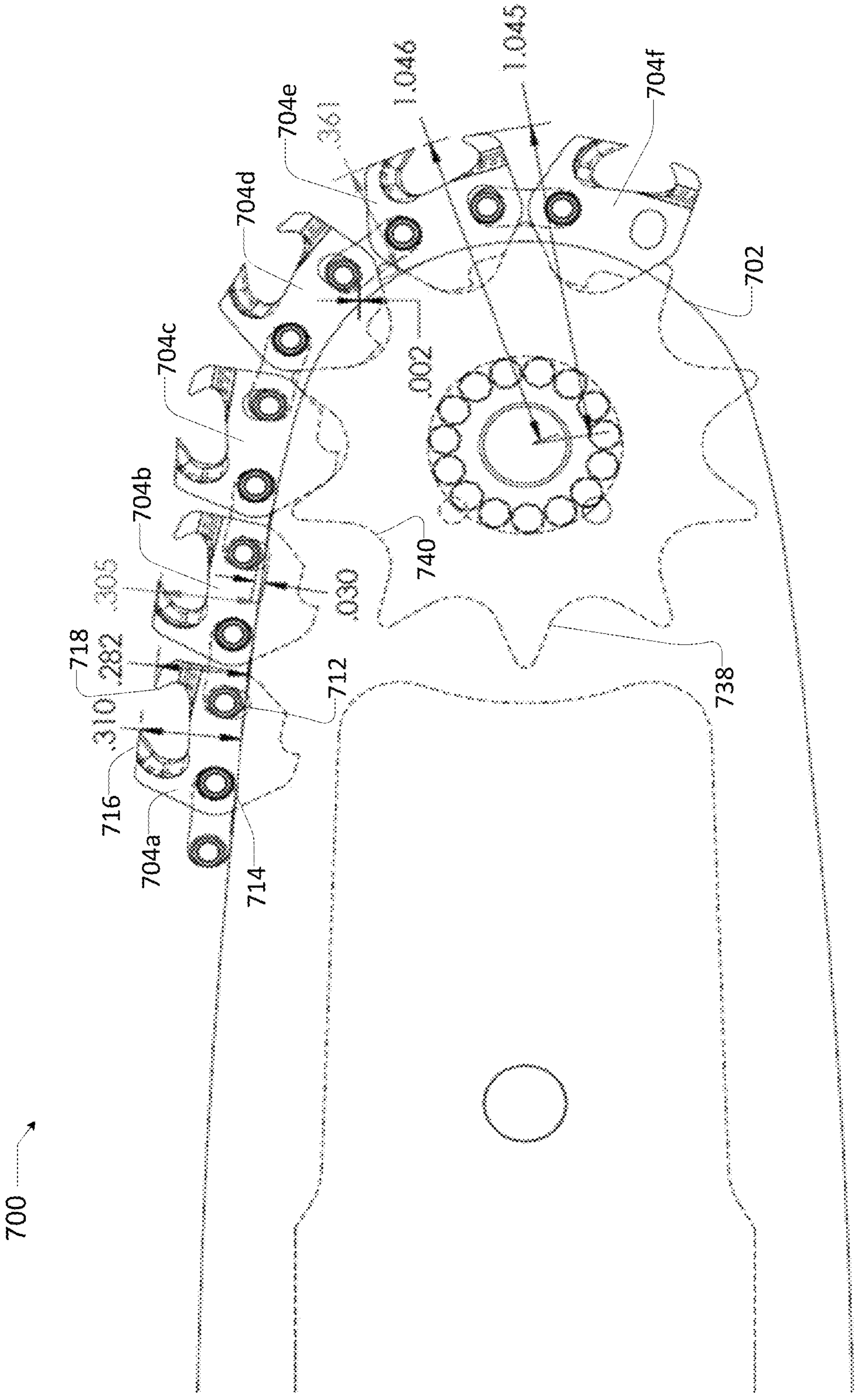
FIG. 7 illustrates a front view of another saw chain on a guide bar, the saw chain including cutter drive links with an oversized rivet hole, in accordance with various embodiments.

FIG. 7 illustrates a saw chain 700 that is traversing the end of a guide bar 702 that includes a sprocket 738. The sprocket 738 may be a drive sprocket or a nose sprocket. The saw chain 700 may include a plurality of cutter drive links 704*a-f*. The cutter drive links 704*a* and 704*b* are shown traversing the elongate portion of the guide bar approaching the sprocket 738, while cutter drive links 704*c-f* are disposed in respective pockets 740 of the sprocket 738. The cutter drive links 704*a-f* each include an oversized rivet hole 712, a normal rivet hole 714, a cutting element 716, and a depth gauge 718. The oversized rivet hole 712 is disposed below the depth gauge 718, and the normal rivet hole 714 is disposed below the cutting element 716.

As shown, cutter drive link 704*a*, which is traversing the elongate portion of the guide bar 702, has a depth gauge setting that is greater than the depth gauge setting of the cutter drive link 704*e*, which is traversing the sprocket 738. The cutter drive links may change their depth gauge setting in response to cutting forces while the drive links traverse the elongate portion of the guide bar 702 (e.g., cutter drive links 702*a* and 702*b* as shown in FIG. 7). However, the sprocket 738 may orient the cutter drive links in a desired orientation and hold the cutter drive links in that orientation as they traverse the sprocket 738 (e.g., on the nose of the guide bar). The cutter drive links may not change their depth gauge setting in response to cutting forces while the cutter drive links traverse the sprocket 738.

Figure 8:
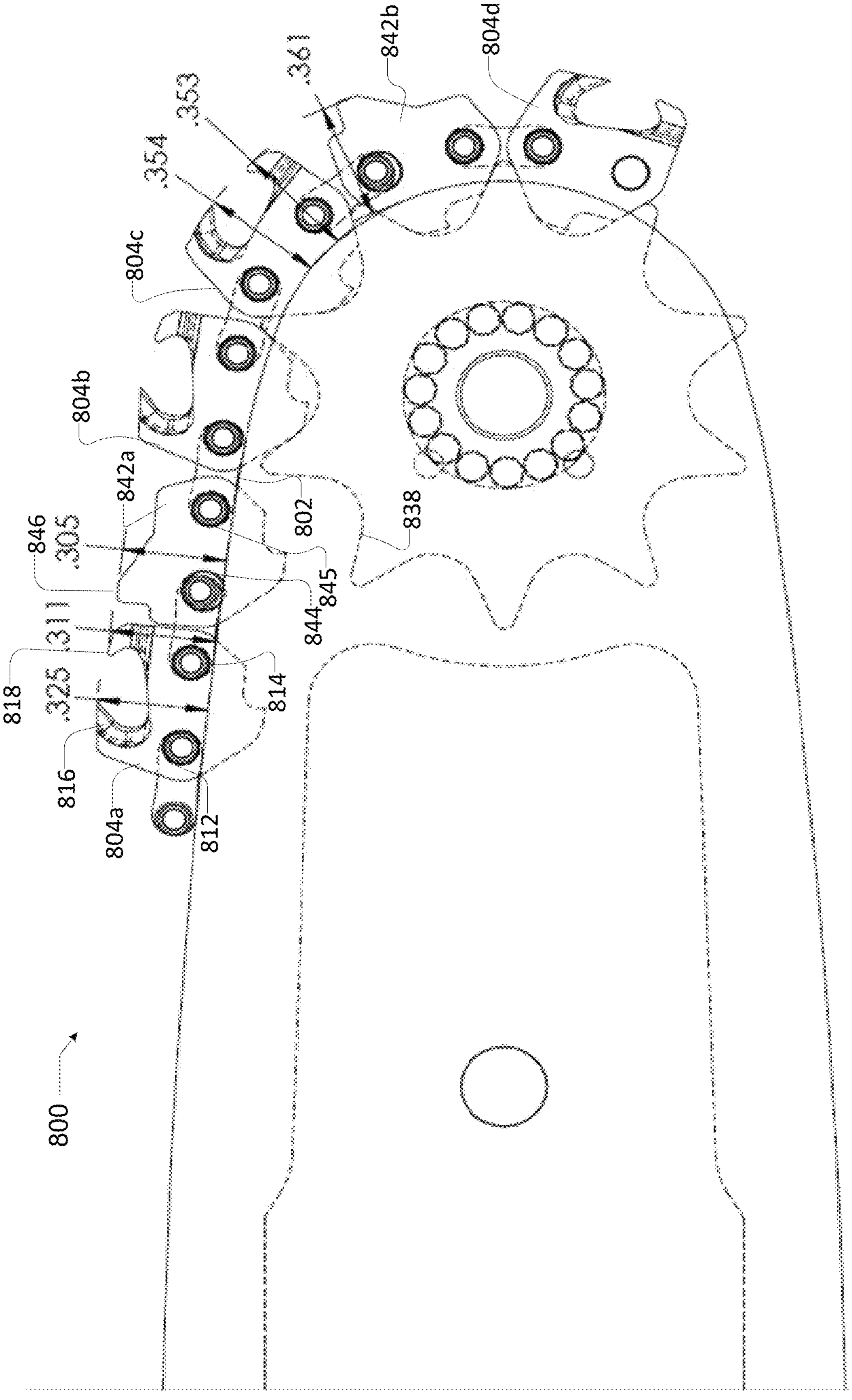
FIG. 8 illustrates a front view of another saw chain on a guide bar, the saw chain including bumper drive links with an oversized rivet hole, in accordance with various embodiments.

FIG. 8 illustrates a saw chain 800 that is traversing the end of a guide bar 802 that includes a sprocket 838. The sprocket 838 may be a drive sprocket or a nose sprocket. The saw chain 800 includes a plurality of cutter drive links 804*a-d*, and a plurality of bumper drive links 842*a-b*.

The cutter drive links 804*a-d* each include two normal rivet holes 812 and 814, a cutting element 816, and a depth gauge 818. The bumper drive links 842*a-b* each include an oversized rivet hole 844 and a normal rivet hole 845. The bumper drive links 842*a-b* further include a bumper portion 846 that extends upward above the oversized rivet hole 844.

On the elongate portion of the guide bar, as illustrated by cutter drive link 804*a* and bumper drive link 842*a*, the bumper portion 846 of the bumper drive link 842*a* is disposed at a lower height (e.g., relative to the guide bar 802) than the depth gauge 818 and the cutting element 816 of the cutter drive link 804*a*. The lower height of the bumper portion 846 on the elongate portion of the guide bar may prevent the bumper portion 846 from interfering with cuts made using the elongate portion of the guide bar.

When the links traverse the sprocket 838 of the guide bar 802, as illustrated by cutter drive link 804*c* and bumper drive link 842*b*, the bumper portion 846 is disposed at a greater height than the depth gauge 818 and the cutting element 816 of the cutter drive link 804*c*. Additionally, the depth gauge setting of the cutter drive link 804*c* is reduced compared with the depth gauge setting of the cutter drive link 804*a*. The greater height of the bumper portion 846 on the sprocket 838 may prevent or reduce kickback of the saw chain 800 on the nose sprocket 838.

In other embodiments, the saw chain may include a bumper drive link that includes a bumper portion disposed above the forward rivet hole and that is disposed immediately behind a cutting element of an adjacent link in the saw chain. The bumper drive link may include an oversized rivet hole below the bumper portion.

In some embodiments, the saw chain may include a tie rivet that includes one or more cam rivets. The cam rivet may include a hub that is off-center from a flange of the cam rivet. The flange may be disposed in the rivet hole of the cutter drive link, while the hub may be disposed in the opposing tie strap. Accordingly, the cam rivet may allow vertical displacement of the cutter drive link with respect to the connecting tie straps.

Figure 9:
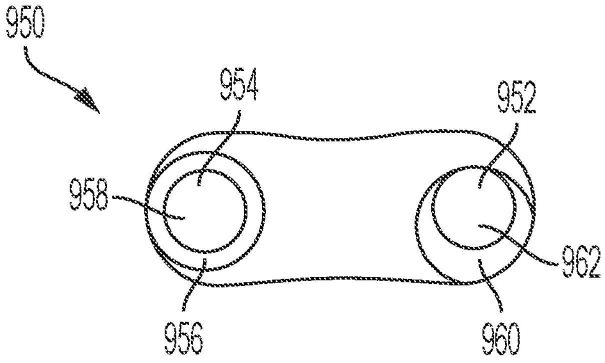
FIG. 9 illustrates a front view of a tie rivet with an integrated cam rivet in accordance with various embodiments.

For example, FIG. 9 illustrates a front view of a tie rivet 950 with a cam rivet 952 and a coaxial rivet 954. The coaxial rivet 954 includes a flange 956 and a hub 958 that have a same central axis. In contrast, the cam rivet 952 includes a flange 960 that has a different central axis from a hub 962 of the cam rivet 952. In some embodiments, the flange 960 may have a cross-sectional shape that is substantially circular. In other embodiments, the flange 960 may have a non-circular cross-sectional shape (e.g., oval, ellipse, etc.). In some embodiments, the flange 960 of the cam rivet 952 may be vertically offset from the flange 956 of the coaxial rivet 954 (e.g., with respect to a longitudinal axis of the tie rivet 950).

Figure 10A:
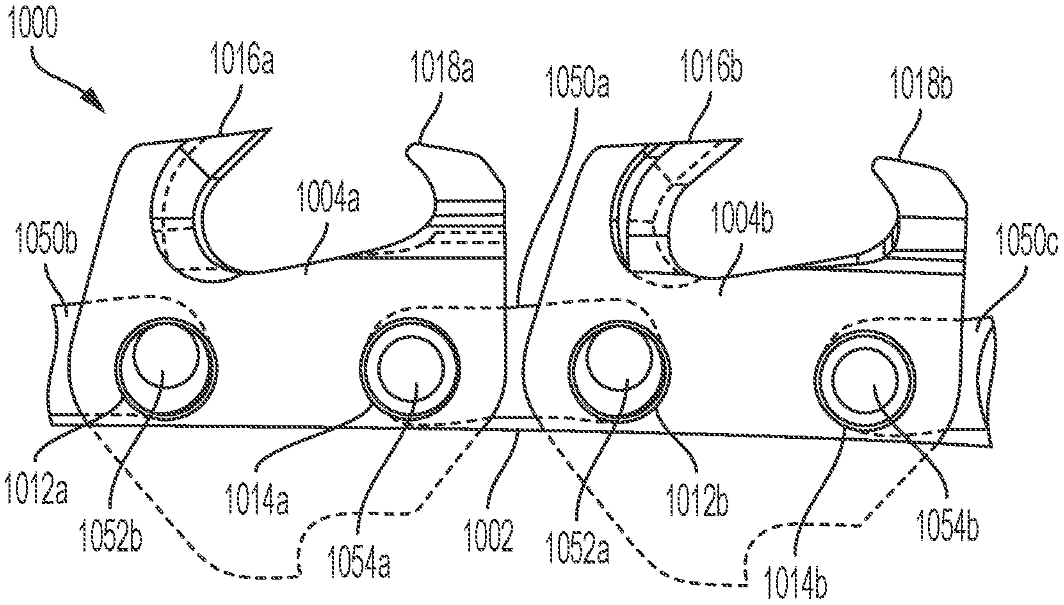
FIG. 10A illustrates a front view of a saw chain including cutter drive links and tie rivets that include a cam rivet, in accordance with various embodiments.

FIG. 10A illustrates a front view of a saw chain 1000 on a guide bar 1002 in accordance with various embodiments. The saw chain 1000 includes a cutter drive link 1004*a* and a cutter drive link 1004*b* that are coupled to one another by a tie rivet 1050*a* that includes a cam rivet 1052*a* and a coaxial rivet 1054*a*. The tie rivet 1050*a* may be similar to the tie rivet 950 of FIG. 9. The cutter drive link 1004*a* includes a cutting element 1016*a* disposed above a rear rivet hole 1012*a*, and a depth gauge 1018*a* disposed above a front rivet hole 1014*a*. Similarly, the cutter drive link 1004*b* includes a cutting element 1016*b* disposed above a rear rivet hole 1012*b*, and a depth gauge 1018*b* disposed above a front rivet hole 1014*b*.

The cam rivet 1052*a* of the tie rivet 1050*a* is disposed in the rear rivet hole 1012*b* of the cutter drive link 1004*b*, which is below the cutting element 1016*b*. The coaxial rivet 1054*a* is disposed in the front rivet hole 1014*a* of the cutter drive link 1004*a*, which is below the depth gauge 1018*a*. A cam rivet 1052*b* of another tie rivet 1050*b* is disposed in the rear rivet hole 1012*a* of the cutter drive link 1004*a*, and a coaxial rivet 1054*b* of another tie rivet 1050*c* is disposed in the front rivet hole 1014*b* of the cutter drive link 1004*b*.

In various embodiments, the cam rivet 1052*b* may cause the depth gauge setting of the cutter drive link 1004*a* to change as the cutter drive link 1004*a* rotates with respect to the tie rivets 1050*a-b*, for example, when the cutter drive link 1004*a* goes from the elongate portion of the guide bar to the end of the guide bar. The depth gauge setting may be changed in a similar relationship to that discussed herein with respect to the cutter drive links with oversized rivet holes.

Figure 10B:
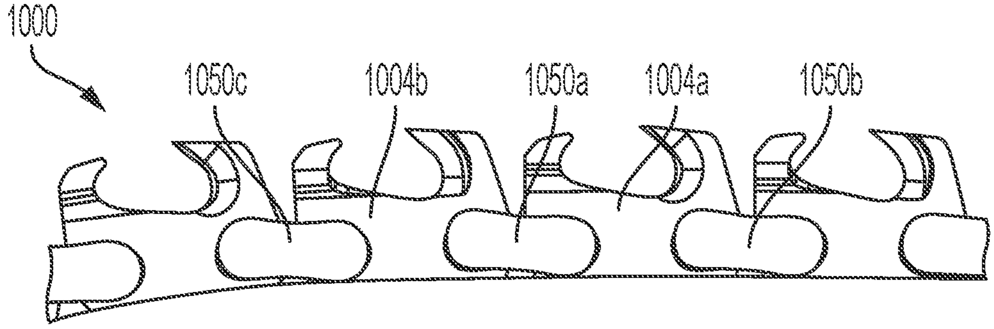
FIG. 10B illustrates a rear view of the saw chain of FIG. 10A.

FIG. 10B illustrates a rear view of the saw chain 1000, showing that the tie rivets 1050*a-c* are angled with respect to the guide bar 1002. This is caused by the vertical offset of the flanges of the cam rivets 1052 compared with the flanges of the coaxial rivets 1054.

As discussed above, the oversized rivet holes may also be used in a saw chain with bi-directional cutter drive links that are designed to be used in two different orientations on the guide bar. For example, the saw chain may be used in a first orientation in which the first rivet hole of the drive links is in the forward direction (e.g., ahead of the second rivet hole in the direction of travel of the saw chain), and may also be used in a second orientation in which the second rivet hole of the drive links is in the forward direction (e.g., ahead of the first rivet hole in the direction of travel).

Figure 11A:
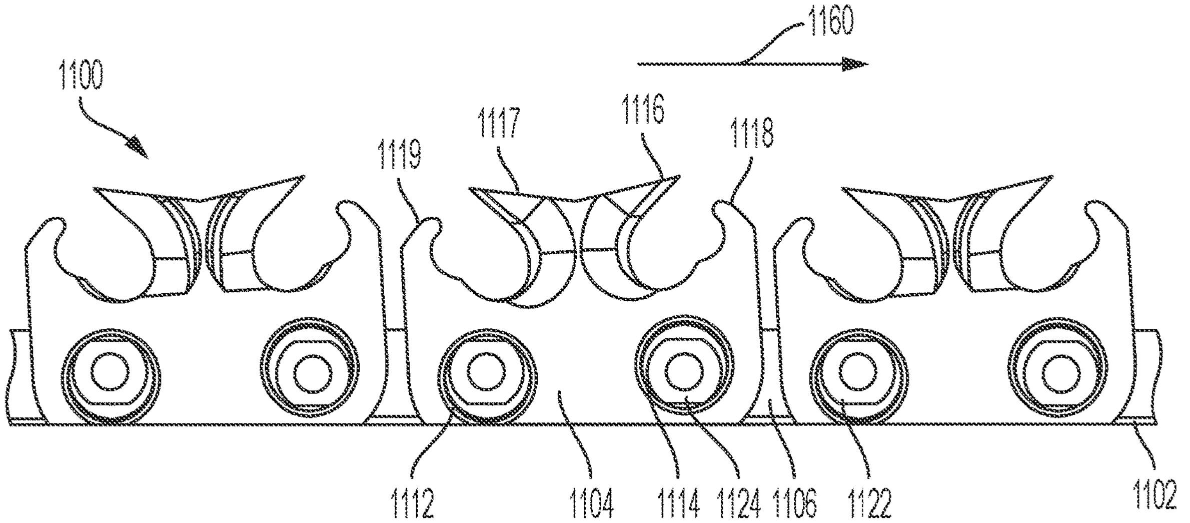
FIG. 11A illustrates a bi-directional saw chain traveling in a first direction while under an applied load (e.g., while cutting wood), in accordance with various embodiments.
Figure 11B:
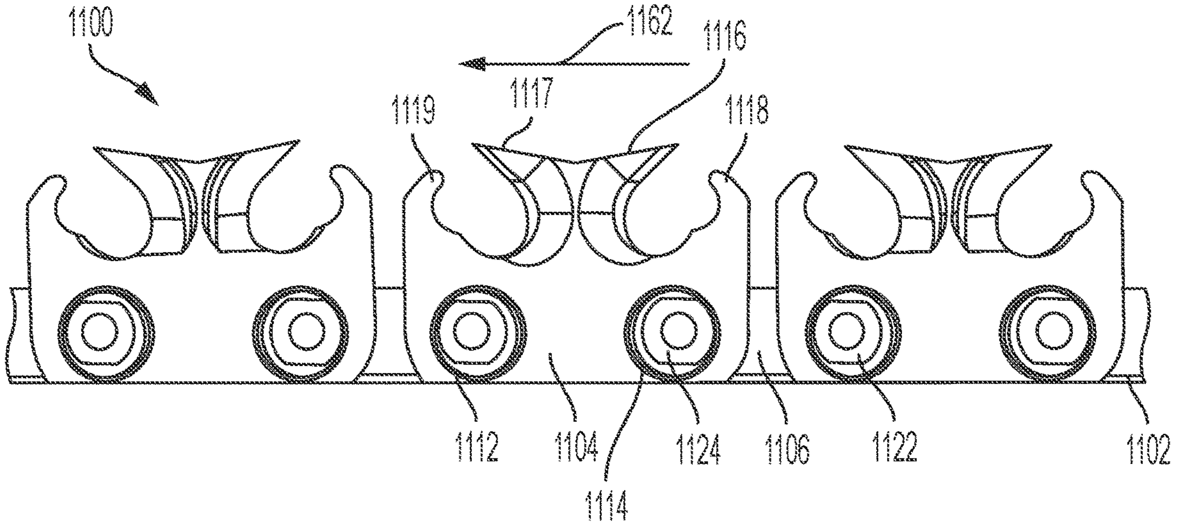
FIG. 11B illustrates the bi-directional saw chain of FIG. 11A traveling in a second direction while not under an applied load (e.g., while not cutting wood), in accordance with various embodiments.
Figure 11C:
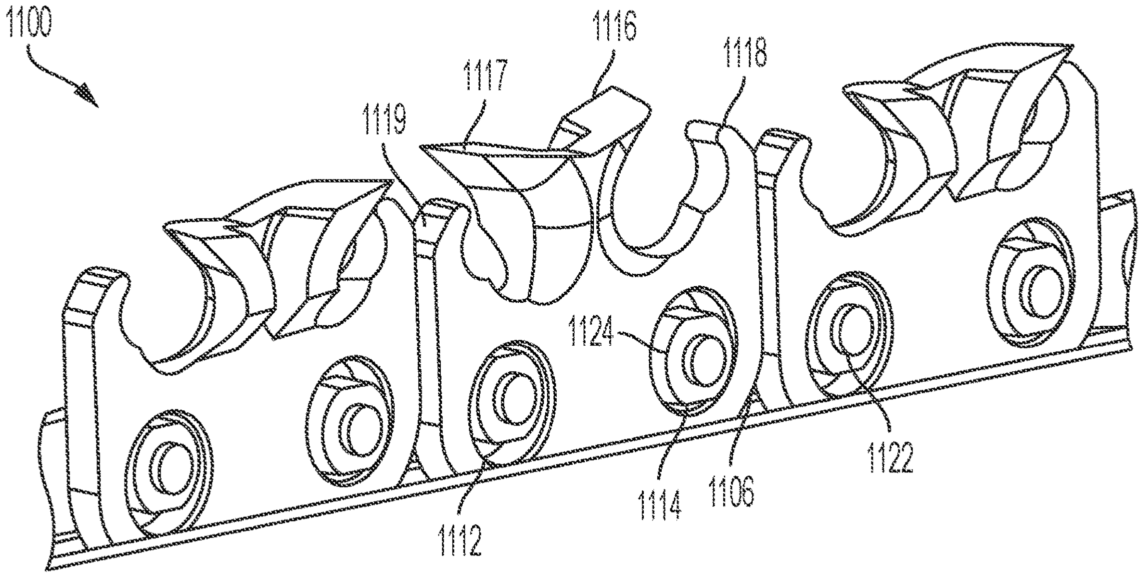
FIG. 11C illustrates a perspective view of the bi-directional saw chain of FIG. 11A.
Figure 11D:
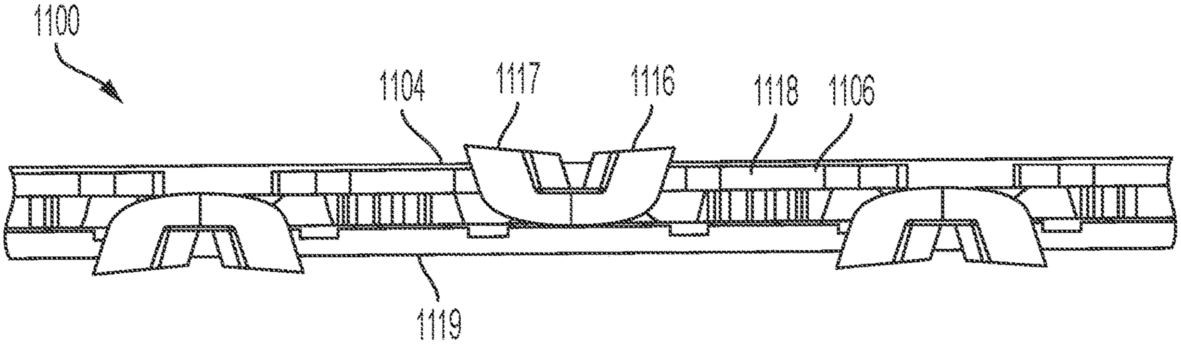
FIG. 11D illustrates a top view of the bi-directional saw chain of FIG. 11A.

FIGS. 11A and 11B illustrate front views of a bi-directional saw chain 1100 in accordance with various embodiments. Additionally, FIG. 11C illustrates a perspective view of the bi-directional saw chain 1100, and FIG. 11D illustrates a top view of the bi-directional saw chain 1100. The saw chain 1100 includes a plurality of bi-directional cutter drive links 1104 coupled to one another by tie rivets 1106.

The bi-directional cutter drive links 1104 include two oversized rivet holes 1112 and 1114. The bi-directional cutter drive links 1104 further include a first cutting element 1116 and a second cutting element 1117 that extend up from the middle of the bi-directional cutter drive link 1104 and are oriented in opposite directions. The first cutting element 1116 may be used to cut when the bi-directional cutter drive link 1104 travels in a first direction with the rivet hole 1114 as the forward rivet hole, and the second cutting element 1117 may be used to cut when the bi-directional cutter drive link 1104 travels in a second direction with the rivet hole 1112 as the forward rivet hole (e.g., opposite the first direction). The bi-directional cutter drive link 1104 may further include a depth gauge 1118 and a depth gauge 1119 extending above the body of the bi-directional cutter drive link 1104 at opposing ends of the bi-directional cutter drive link 1104 (e.g., on opposite sides of the cutting elements 1116 and 1117).

The tie rivets 1106 of saw chain 1100 include a first rivet 1122 that is disposed in the rivet hole 1112 of one bi-directional cutter drive link 1104, and a second rivet 1124 that is disposed in the rivet hole 1114 of an adjacent bi-directional cutter drive link 1104. A diameter of the first rivet 1122 may be less than a diameter of the oversized rivet hole 1112, thereby providing a clearance between the first rivet 1122 and the oversized rivet hole 1112. Additionally, a diameter of the second rivet 1124 may be less than a diameter of the oversized rivet hole 1114, thereby providing a clearance between the first rivet 1124 and the oversized rivet hole 1114. In some embodiments, the clearance may be about 0.010 inches or more, such as about 0.020 inches.

FIGS. 11A and 11B show the cutter drive links 1104 of saw chain 1100 in two different stable positions relative to the rivets 1122 and 1124 and/or guide bar 1102. For example, a first stable position of the cutter drive links 1104 shown in FIG. 11A may occur when the cutter drive links 1104 are traveling in a first direction 1160 in which the rivet 1124 is the forward rivet and the cutting element 1116 is engaged in cutting (and subjected to a cutting force), and a second stable position of the cutter drive links 1104 shown in FIG. 11B may occur when the cutting element 1116 is not engaged in cutting and the cutter drive links 1104 are traveling in a second direction 1162 in which the rivet 1122 is the forward rivet. In the first stable position, the cutting element 1116 may extend higher because the oversized rivet holes 1112 and 1114 allow the cutter drive link 1104 to tip up from the cutting force on cutting element 1116. Cutting element 116 extends higher than the cutting element 1117 to promote cutting by the cutting element 1116 and provide a relief angle for the cutting element 1116. When the chain travels in the second direction 1162, the cutting element 1117 may engage in cutting and extend higher than the cutting element 1116 to promote cutting by the cutting element 1117 and provide a relief angle for the cutting element 1117. FIG. 11B shows the cutting elements 1116 and 1117 at the same height above the bar rails because neither is cutting and the restoring forces of the chain tension orient the cutting elements 1116 and 1117 to the same height.

In various embodiments, the cutter drive links 1104 of the saw chain 1100 may enter the first or second stable position responsive to respective tensile and cutting forces caused by the saw chain 1100 moving in the first direction 1160 or second direction 1162. Additionally, or alternatively, the oversized rivet holes 1112 and 1114 of the cutter drive links 1104 may allow the position of the cutter drive links 1104 to change responsive to receiving a cutting load, as described herein. Furthermore, other components of the chain may be used to introduce one or more restorative forces to use the freedom of movement provided by the oversized rivet holes 1112 and 1114 to place the cutter drive links 1104 in a desired position.

As best seen in FIGS. 11C and 11D, the cutting elements 1116 and 1117 of the cutter drive links 1104 may twist out of the plane of the link and extend over a side of the cutter drive link 1104. In some embodiments, the cutting elements 1116 and 1117 of individual cutter drive links 1104 may extend over a same side of the cutter drive link 1104. The saw chain 1100 may alternate between cutter drive links 1104 with cutting elements 1116 and 1117 that extend over a one side and cutter drive links 1104 with cutting elements 1116 and 1117 that extend over the opposite side.

Figure 12A:
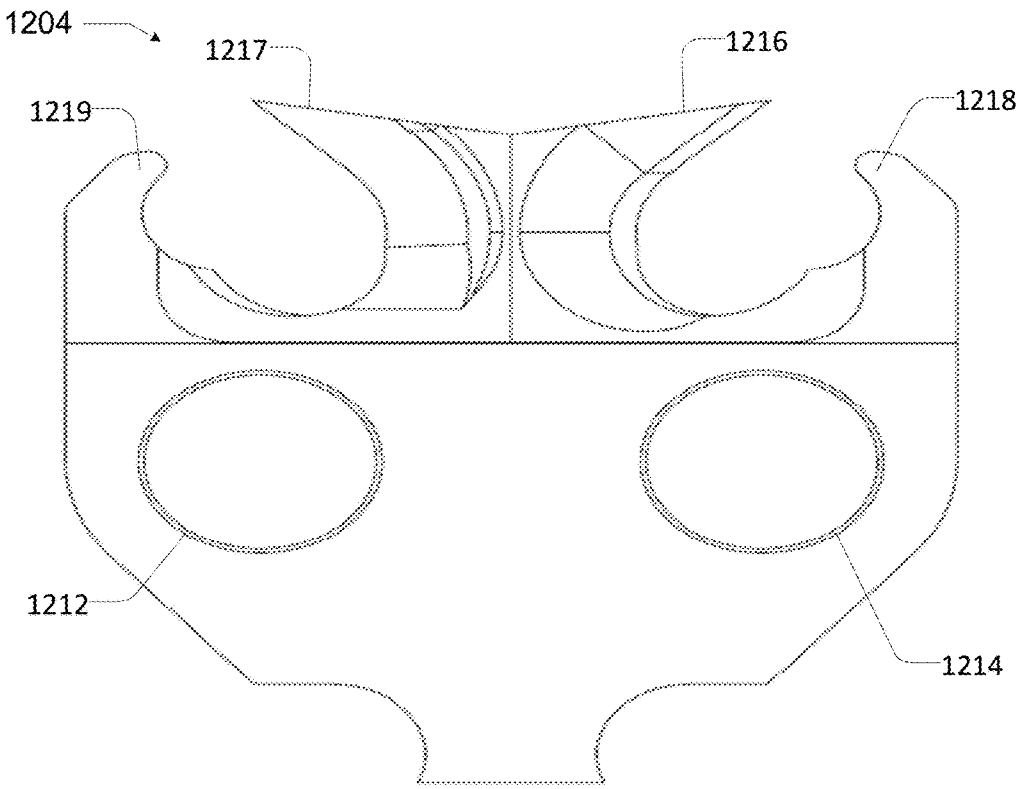
FIG. 12A illustrates a front view of a bi-directional cutter drive link in accordance with various embodiments.
Figure 12B:
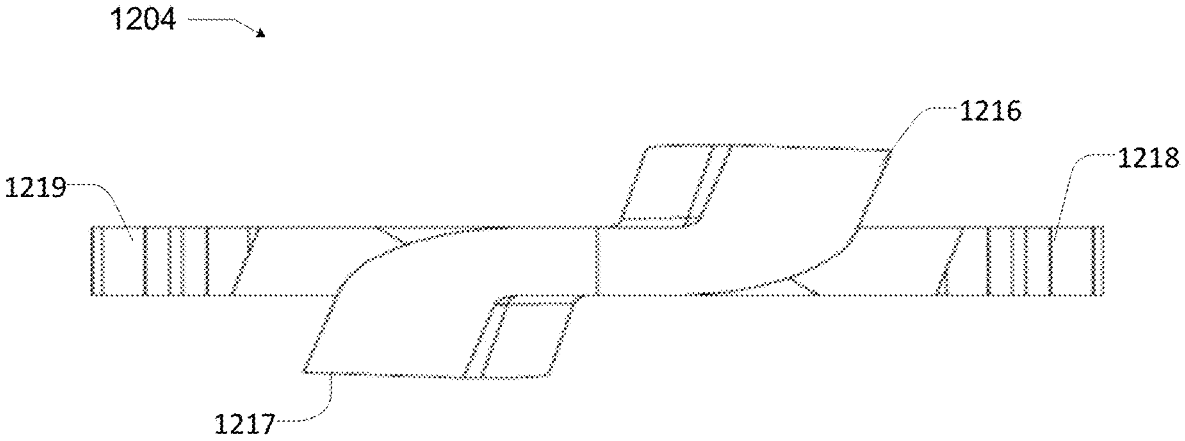
FIG. 12B illustrates a top view of the bi-directional cutter drive link of FIG. 12A in accordance with various embodiments.

FIGS. 12A and 12B illustrate a front view and a top view, respectively, of an alternative cutter drive link 1204 in accordance with various embodiments. The cutter drive link 1204 includes oversized rivet holes 1212 and 1214, cutting elements 1216 and 1217, and depth gauges 1218 and 1219. As best seen in FIG. 12B, the cutting elements 1216 and 1217 extend over opposite sides of the cutter drive link 1204.

In some embodiments, all cutter links of a saw chain may be cutter drive links 1204. Alternatively, a saw chain may include a mix of cutter drive links 1204 and cutter drive links 1104.

Figure 13:
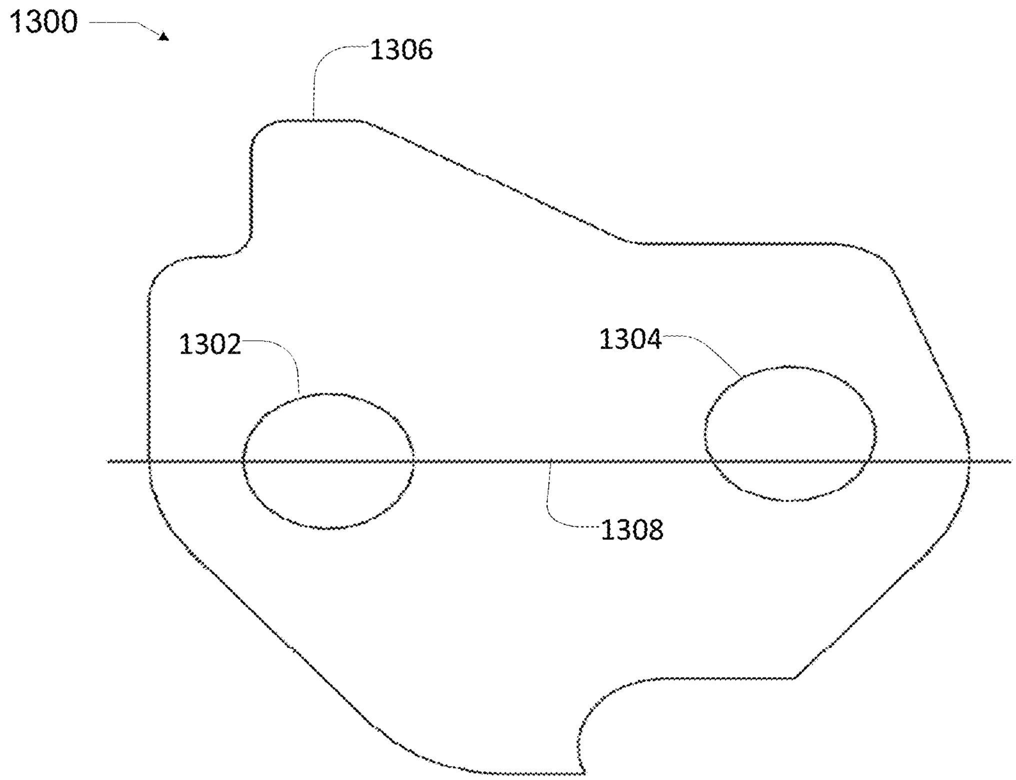
FIG. 13 illustrates a front view of a bumper drive link with vertically offset oversized rivet holes, in accordance with various embodiments.

In some embodiments, a saw chain link may include a pair of oversized rivet holes that are vertically offset from one another (e.g., with respect to a pitch line of the saw chain). For example, FIG. 13 illustrates a bumper drive link 1300 that includes oversized rivet holes 1302 and 1304. A bumper portion 1306 of the bumper drive link 1300 is disposed above the oversized rivet hole 1302. The oversized rivet holes 1302 and 1304 are vertically offset from one another with respect to a pitch line 1308. As shown, oversized rivet hole 1304 is disposed above oversized rivet hole 1302 with respect to the pitch line 1308. The offset can be used to control the orientation of the bumper drive link 1300 when subjected to different conditions (e.g., direction of travel, loading, or position on the guide bar (e.g., on the elongate portion or the end)).

Figure 14:
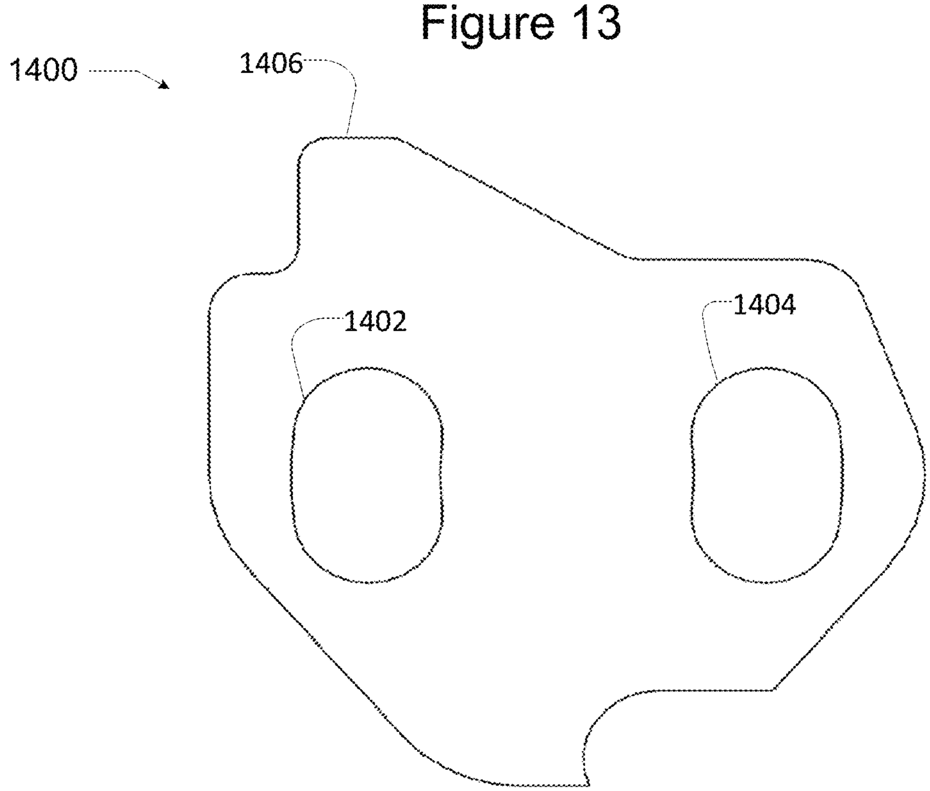
FIG. 14 illustrates a front view of a bumper drive link with oversized rivet holes, in accordance with various embodiments.

In some embodiments, the oversized rivet holes may be non-circular. For example, FIG. 14 illustrates a bumper drive link 1400 with oversized rivet holes 1402 and 1404, and a bumper portion 1406. The oversized rivet holes 1402 and 1404 have a cross-sectional shape that corresponds to a curved slot.

In various embodiments, the shape of the rivet hole and corresponding rivet may at least partially determine the type and magnitude of the restorative force caused by tension in the saw chain. In some embodiments, different stable positions of a saw chain link may be designed to have substantially the same or similar tensile forces in each position. Accordingly, the saw chain link may rotate to a stable position and stay in that position without a restorative force trying to move it back to another stable position. This may be useful, for example, to allow the position to be stable without a cutting load applied.

Alternatively, the saw chain link and/or rivets may be designed to apply a restorative force on the link when the components are in a specific position. The restorative force may encourage the link to move back to another position (e.g., when a cutting load is removed).

Figure 15A:
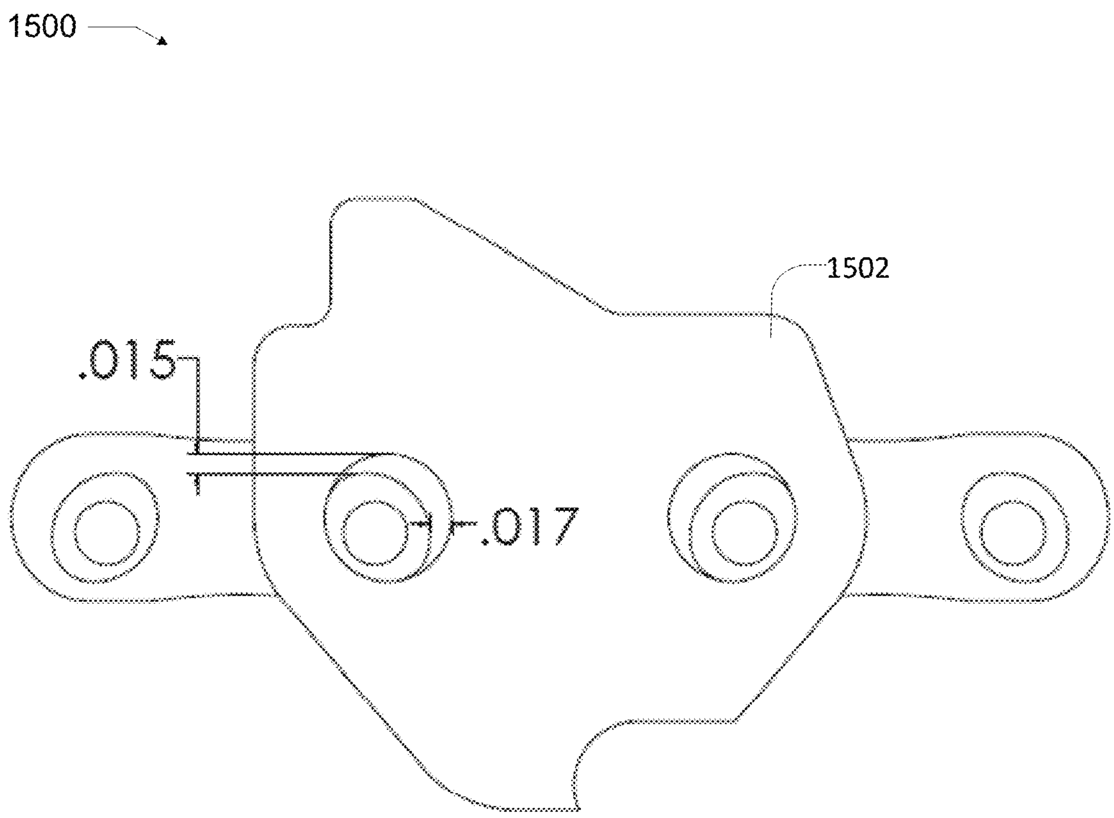
FIG. 15A illustrates a saw chain in which the bumper drive link may move closer to the bar rails when a load is placed on the bumper portion and may move back to the original position when the load is removed, in accordance with various embodiments.
Figure 15B:
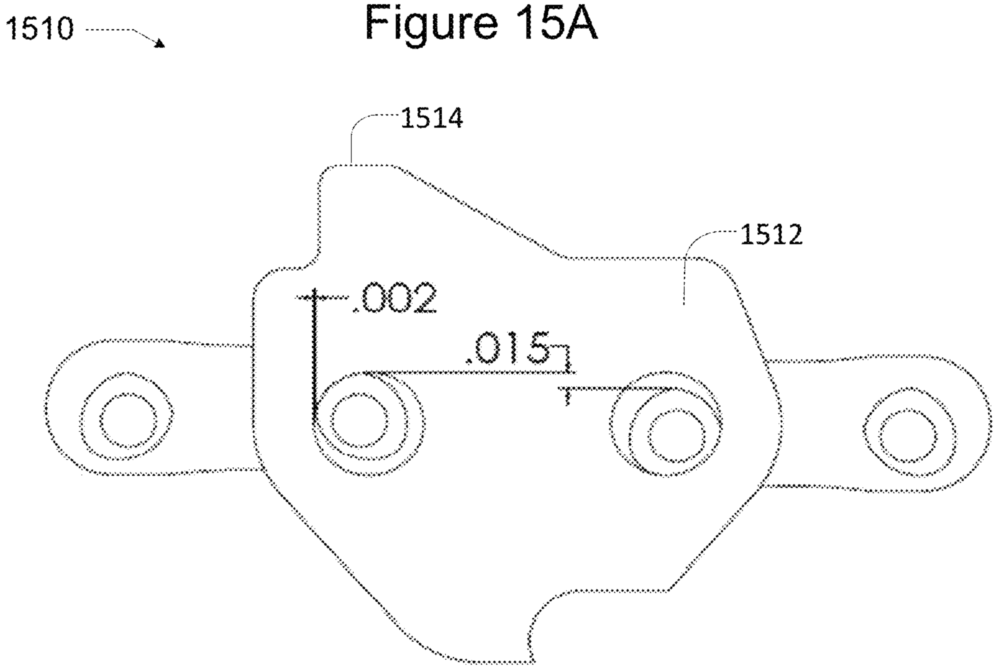
FIG. 15B illustrates a saw chain in which the bumper drive link 1502 may tip or rotate in response to a load placed on the bumper portion and/or orienting forces from a sprocket, in accordance with various embodiments.

For example, FIG. 15A illustrates a saw chain 1500 in which the bumper drive link 1502 may move closer to the bar rails when a load is placed on the bumper portion and may move back to the original position when the load is removed. FIG. 15B illustrates a saw chain 1510 in which the bumper drive link 1502 can tip or rotate in response to a load placed on the bumper portion 1514 and/or orienting forces from a sprocket.

Figure 16:
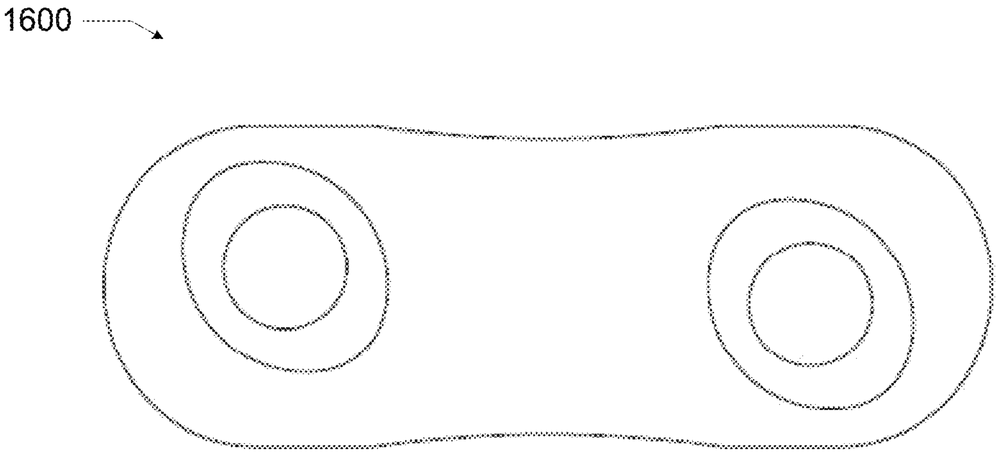
FIG. 16 illustrates a tie rivet with cam rivets in accordance with various embodiments.
Figure 17:
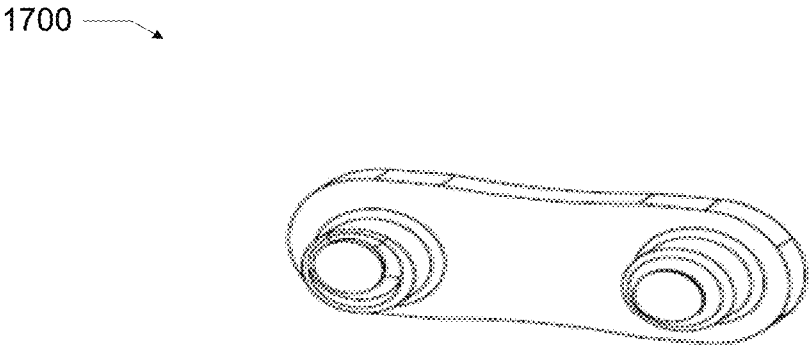
FIG. 17 illustrates another tie rivet with cam rivets in accordance with various embodiments.
Figure 18:
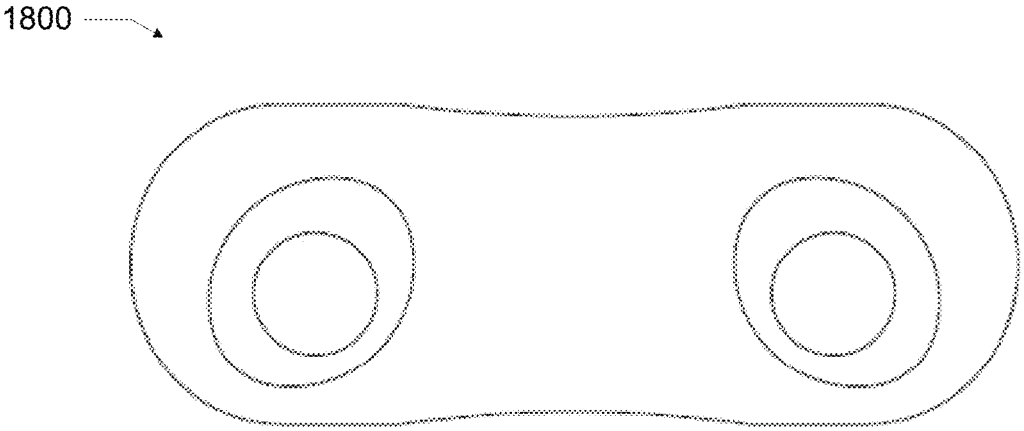
FIG. 18 illustrates another tie rivet with cam rivets in accordance with various embodiments.

In some embodiments, cam rivets may be used with saw chain links that have a pair of oversized rivet holes. For example, one or both of the rivets disposed in the oversized rivet holes of a saw chain link may be a cam rivet. FIGS. 16, 17, and 18 show example tie rivets 1600, 1700, and 1800, respectively, with cam rivets in accordance with various embodiments. Although not shown in FIGS. 16, 17, and 18, in some embodiments, the tie rivets 1600, 1700, and 1800 may be cutter tie strap links that include a cutting element and/or depth gauge, and integrated cam rivets.

Figure 19A:
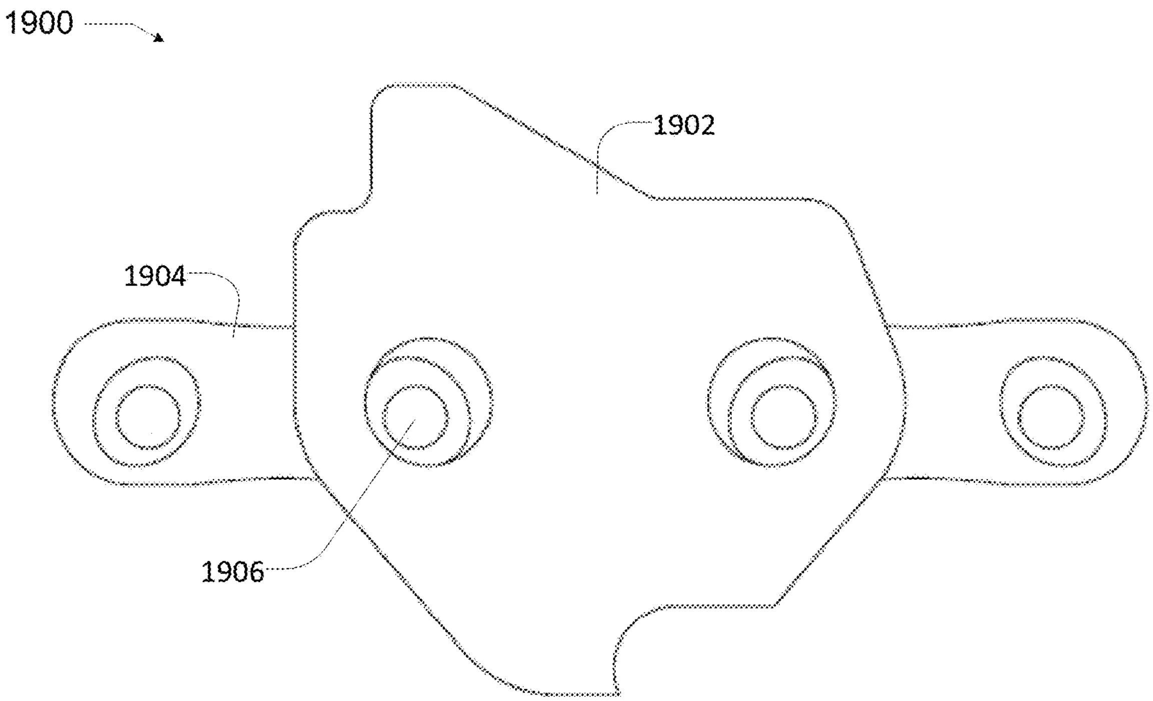
FIG. 19A illustrates a front view of a saw chain with a bumper drive link and tie rivets, in accordance with various embodiments.
Figure 19B:
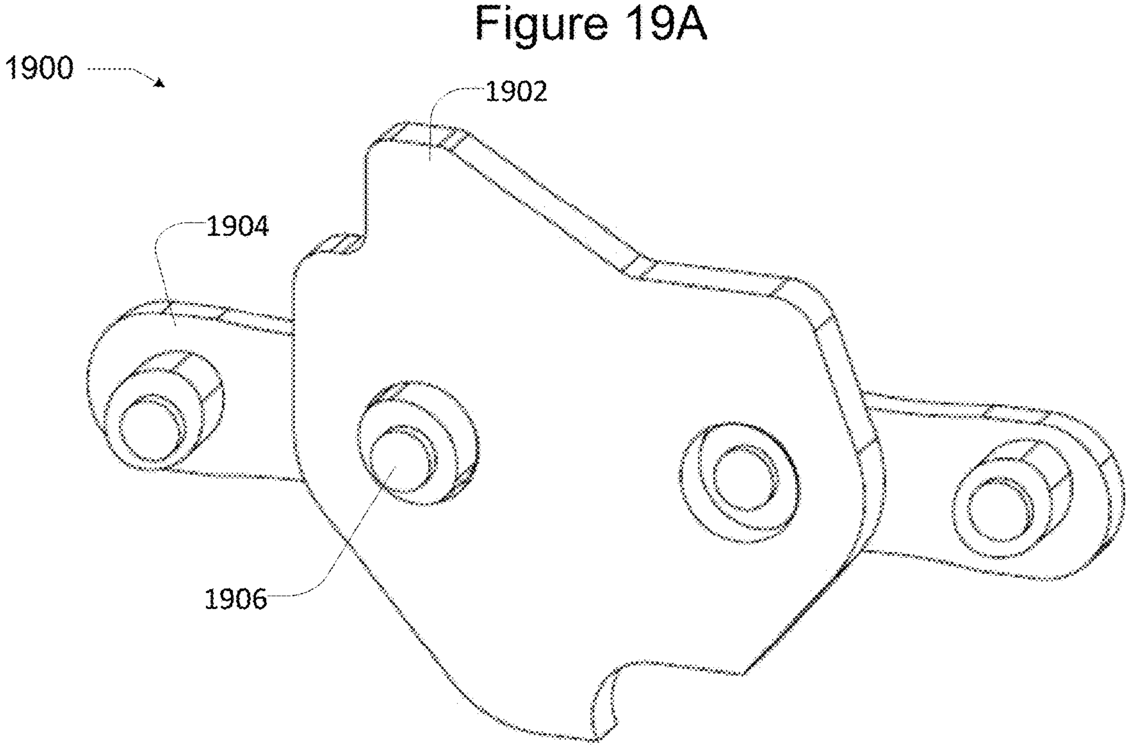
FIG. 19B illustrates a perspective view of the saw chain of FIG. 19A.

FIGS. 19A and 19B illustrate a saw chain 1900 with a bumper drive link 1902 and tie rivets 1904. The tie rivets 1904 each have a pair of cam rivets 1906.

Figure 20:
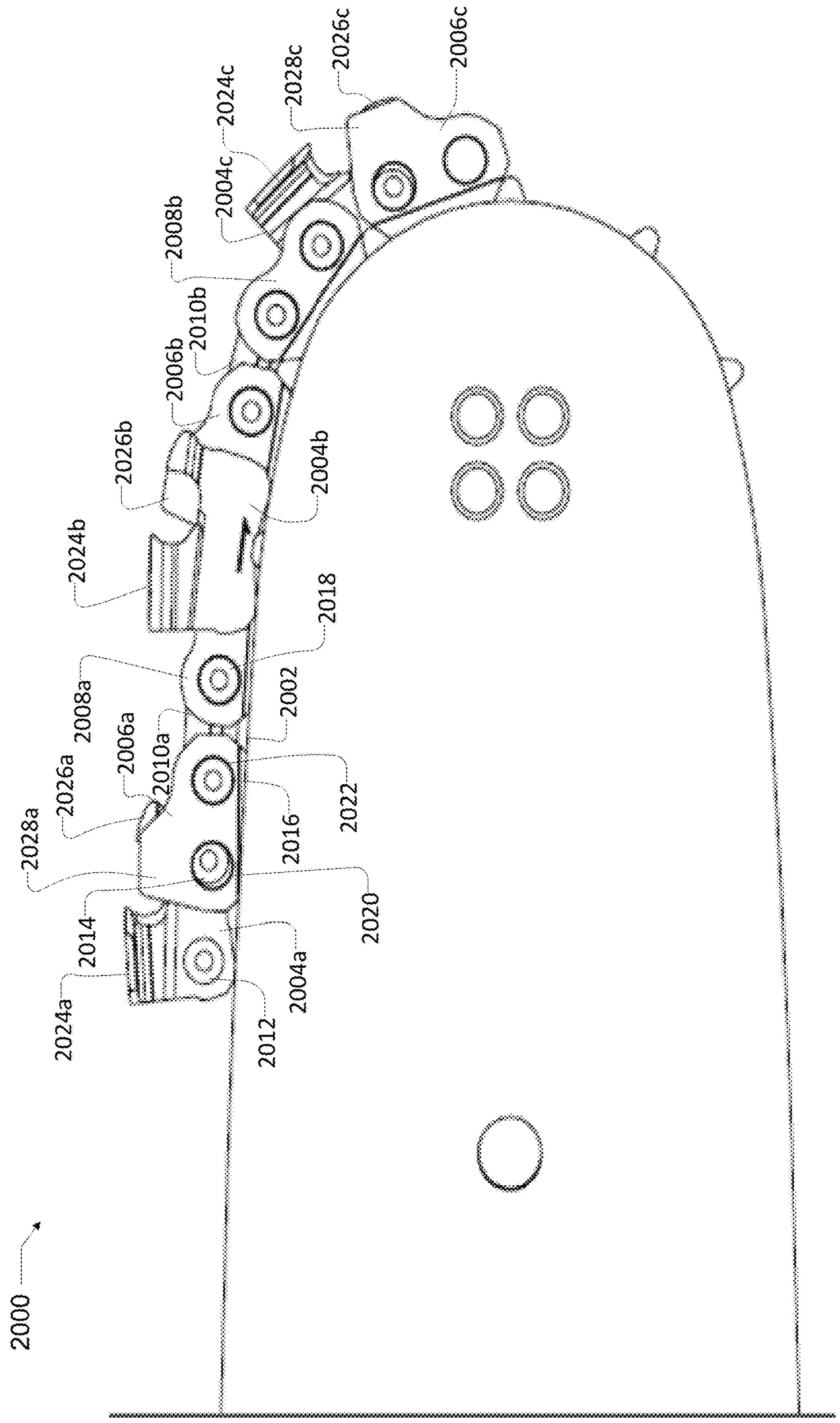
FIG. 20 illustrates a saw chain as it traverses a guide bar, the saw chain including cutter tie strap links, bumper drive links, and tie rivets, in accordance with various embodiments.

FIG. 20 illustrates a saw chain 2000 as it traverses a guide bar 2002. The saw chain 2000 includes cutter tie strap links

2004*a-c*, bumper drive links 2006*a-c*, drive links 2008*a-b*, and tie rivets 2010*a-b*. The cutter tie strap links 2004*a-c* include integrated rivets 2012 and 2014. In some embodiments, rivet 2014 may be a cam rivet, while rivet 2012 may be a normal co-axial rivet. The tie rivets 2010*a-b* may also include a pair of integrated rivets 2016 and 2018. The bumper drive links 2006*a-c* may include a rear rivet hole 2020 and a forward rivet hole 2022. The cam rivet 2014 of the adjacent cutter tie strap link 2004*a-c* may be disposed in the rear rivet hole 2020, and may provide a clearance between the flange of the cam rivet 2014 and the side of the rear rivet hole 2020. The rivet 2016 of the adjacent tie rivet 2010*a-b* may be disposed in the forward rivet hole 2022 of the bumper drive link 2006*a-c*. The rivet 2016 may not have a significant clearance from the forward rivet hole 2022.

The cutter tie strap links 2004*a-c* further include a cutting edge 2024*a-c* and a depth gauge 2026*a-c*. The bumper drive links 2006*a-c* further include a bumper portion 2028*a-c*.

Bumper drive link 2006*a* is shown in FIG. 20 with a cutting load applied. Accordingly, the bumper portion 2028*a* is disposed below the depth gauge 2026*a* of the cutter tie strap link 2004*a*, thus exposing the depth gauge 2026*a* to the workpiece being cut. Bumper drive link 2006*b* is shown in an interim position as it is starting to engage a nose sprocket of the guide bar 2002. Bumper drive link 2006*c* is shown when it is engaged with a tooth of the nose sprocket. The bumper portion 2028*c* of the bumper drive link 2006*c* is disposed closer to the cutting edge 2024*c* of the cutter tie strap link 2004*c* than the depth gauge 2026*c*, allowing a greater reduction of kickback than afforded by just the depth gauge 2026*c*.

Figure 21:
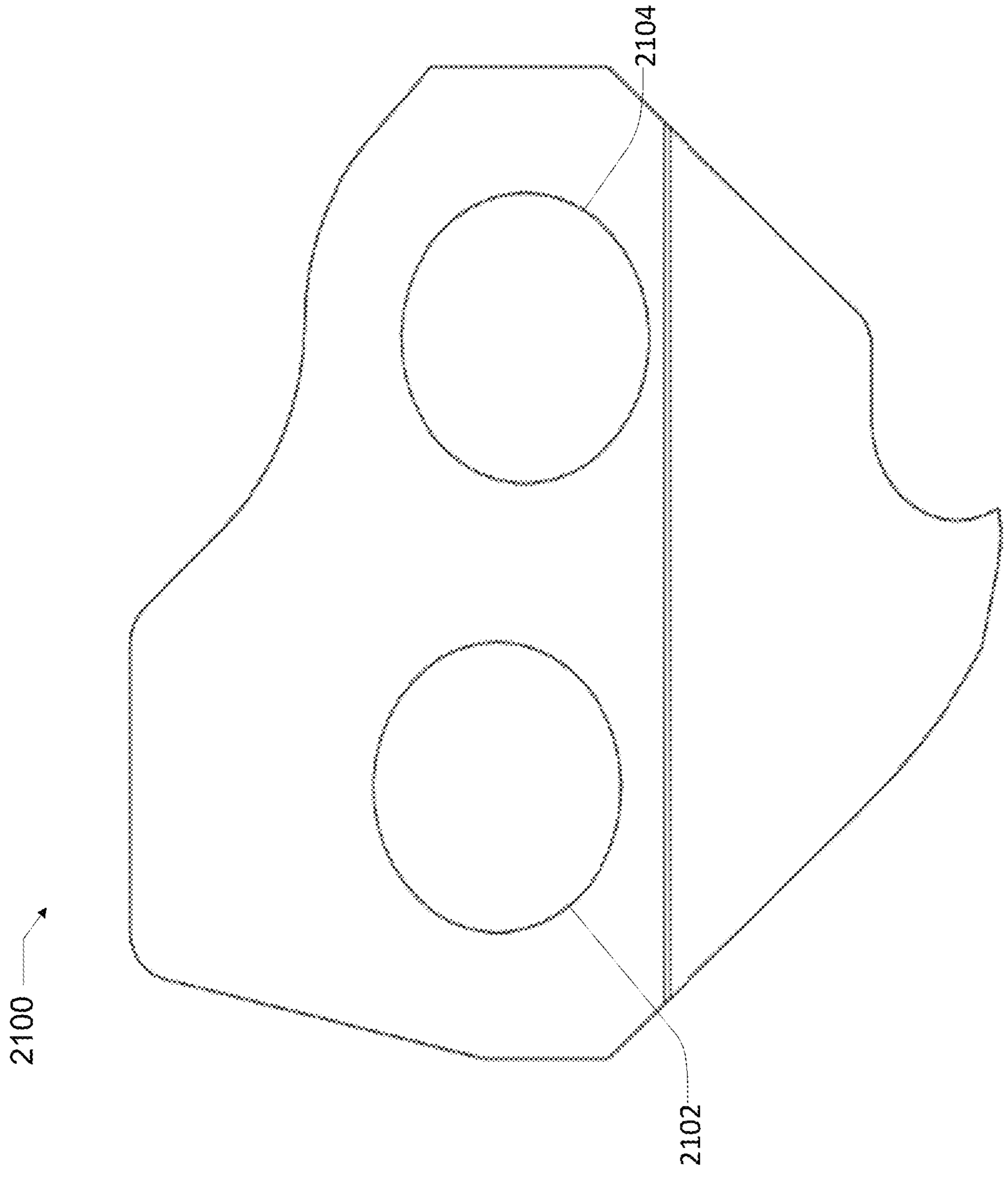
FIG. 21 illustrates a bumper drive link with vertically offset rivet holes, in accordance with various embodiments.
Figure 22:
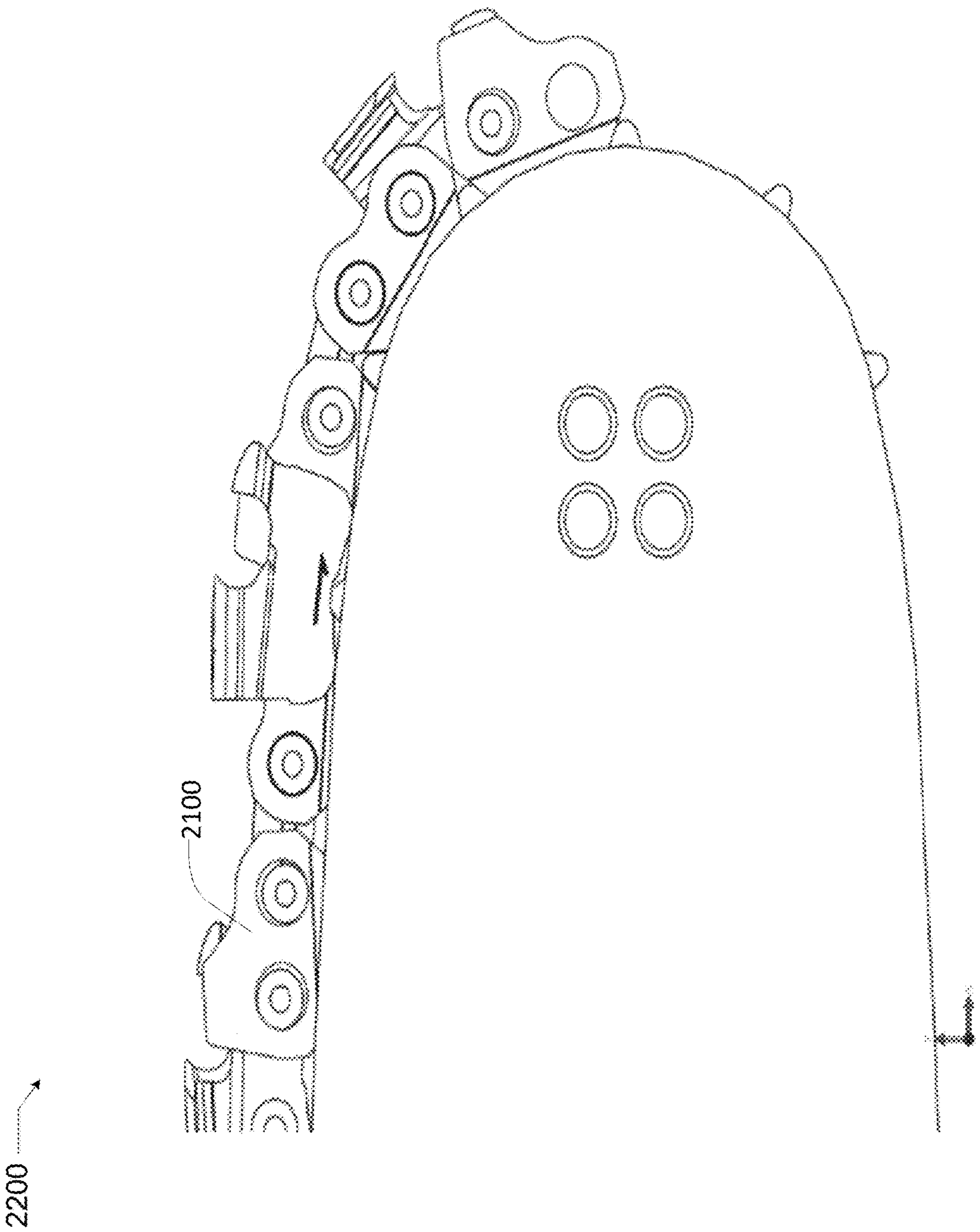
FIG. 22 illustrates another saw chain as it traverses a guide bar, the saw chain including cutter tie strap links, bumper drive links, and tie rivets, in accordance with various embodiments.

In some embodiments, the bumper drive links 2006*a-c* of saw chain 2000 may be replaced with bumper drive links with rivet holes that are vertically offset. For example, FIG. 21 illustrates a bumper drive link 2100 with rivet holes 2102 and 2104 that are vertically offset from one another, and FIG. 22 illustrates a saw chain 2200 that is similar to the saw chain 2000, except with the bumper drive links 2100 in place of the bumper drive links 2006*a-c*.

Figure 23A:
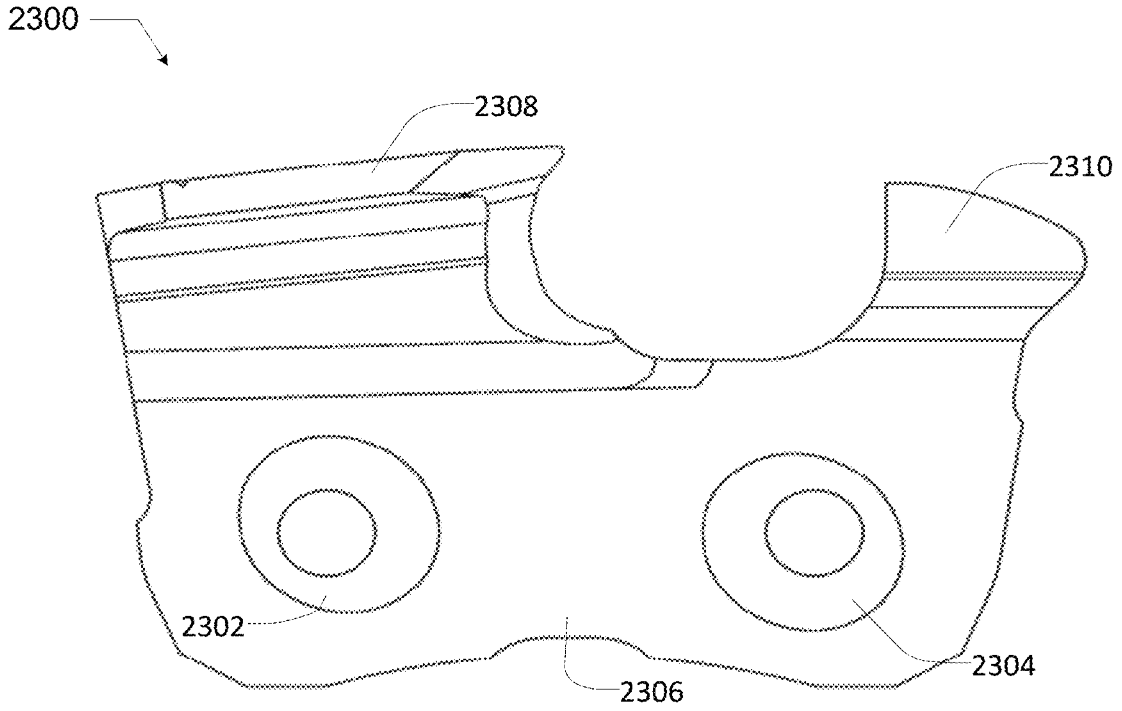
FIG. 23A illustrates a front view of a cutter tie strap link with a pair of cam rivets, in accordance with various embodiments.
Figure 23B:
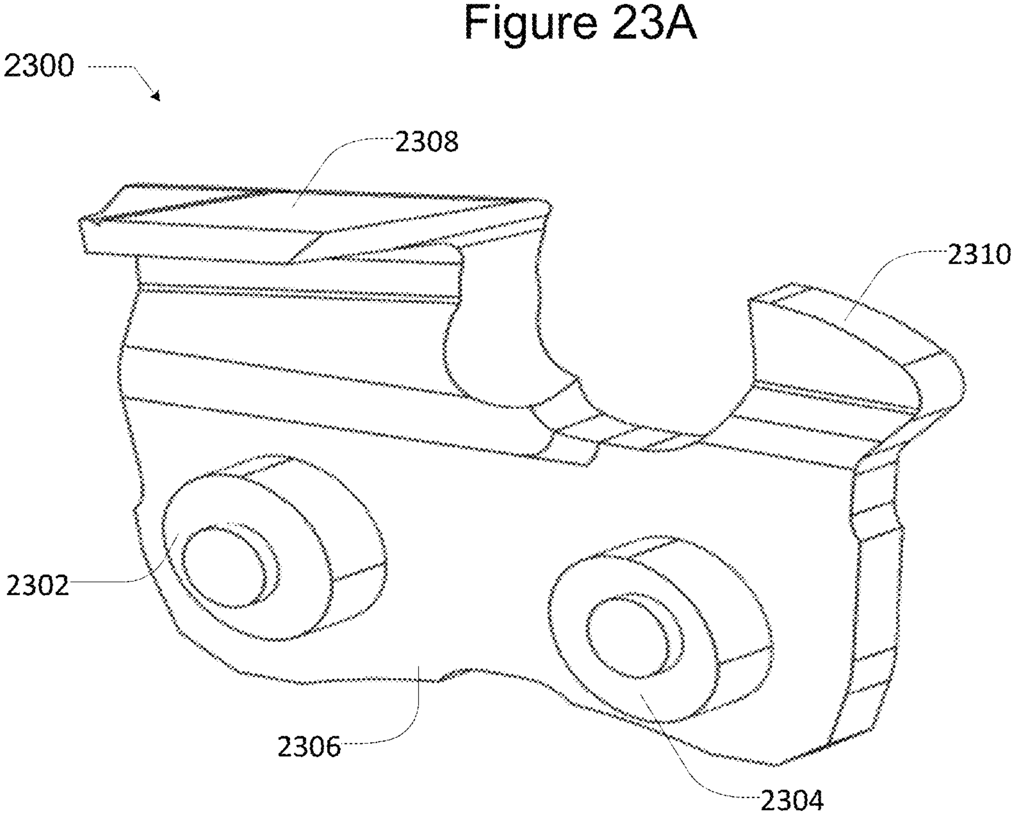
FIG. 23B illustrates a perspective view of the cutter tie strap link of FIG. 23A.

FIGS. 23A and 23B illustrate a cutter tie strap link 2300 with a pair of cam rivets 2302 and 2304, in accordance with various embodiments. The cam rivets 2302 and 2304 extend from a body 2306 of the cutter tie strap link 2300. The cutter tie strap link 2300 further includes a cutting element 2308 disposed above the cam rivet 2302, and a depth gauge 2310 disposed above the cam rivet 2304.

In some embodiments, a saw chain may include one or more drive links that include one or more oversized rivet holes, and one or more drive links that do not include oversized rivet holes. The drive links that include one or more oversized rivet holes may change position responsive to a cutting load, while the drive links that do not include oversized rivet holes may not change position responsive to the cutting load.

Figure 24A:
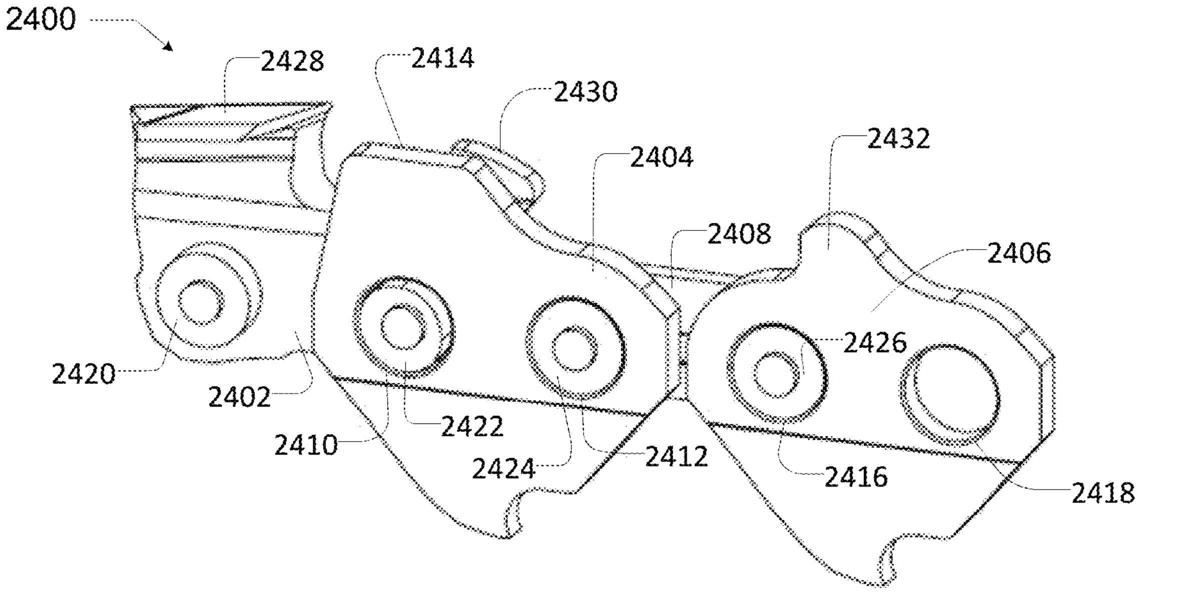
FIG. 24A illustrates a perspective view of a saw chain in accordance with various embodiments.
Figure 24B:
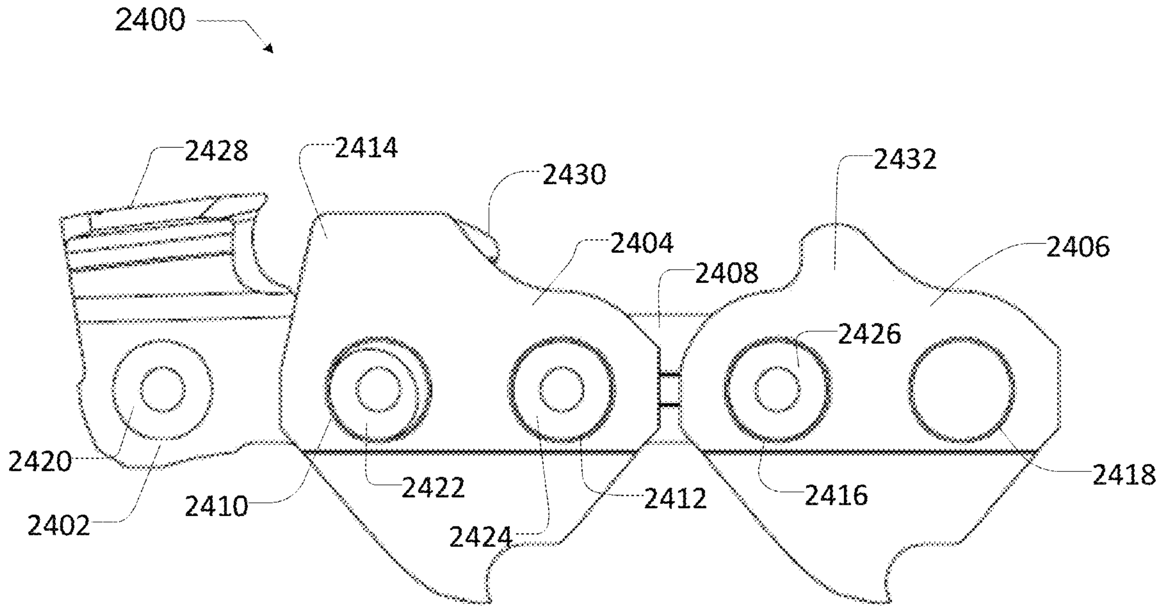
FIG. 24B illustrates a front view of the saw chain of FIG. 24A under chain tension and no cutting load.
Figure 24C:
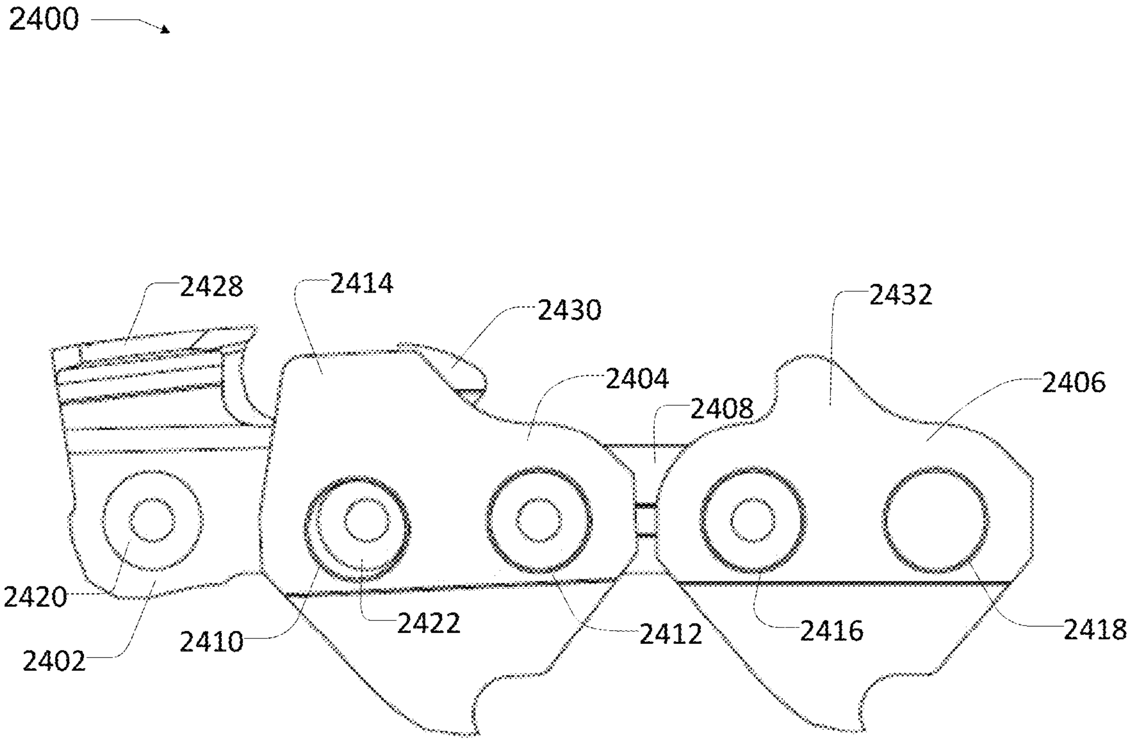
FIG. 24C illustrates a front view of the saw chain of FIG. 24A under chain tension and with a cutting load applied.

For example, FIGS. 24A-C illustrate a saw chain 2400 in accordance with various embodiments. The saw chain 2400 includes a cutter tie strap link 2402, a bumper drive link 2404, a bumper drive link 2406, and a tie rivet 2408. The bumper drive link 2404 includes an oversized rivet hole 2410 and a normal rivet hole 2412, with the oversized rivet hole 2410 disposed below a bumper portion 2414 of the bumper drive link 2404. The bumper drive link 2406 includes two normal rivet holes 2416 and 2418.

The cutter tie strap link 2402 includes integrated rivets 2420 and 2422. Rivet 2422 is disposed in the oversized rivet hole 2410 of the bumper drive link 2404 and provides a clearance between the oversized rivet hole 2410 of the bumper drive link 2404. In some embodiments, the rivet 2422 may be a cam rivet as shown in FIGS. 24A-C. The tie rivet 2408 includes integrated rivets 2424 and 2426 that are disposed in the rivet hole 2412 of the bumper drive link 2404 and the rivet hole 2416 of the bumper drive link 2406. The cutter tie strap link 2402 further includes a cutting element 2428 disposed above the integrated rivet 2420 and a depth gauge 2430 disposed above the integrated rivet 2422. Additionally, the bumper drive link 2406 includes a bumper portion 2432.

FIG. 24B illustrates the saw chain 2400 under chain tension and no cutting load. As shown, the bumper portion 2414 of the bumper drive link 2404 is disposed above the depth gauge 2430 of the cutter tie strap link 2402.

FIG. 24C illustrates the saw chain 2400 under chain tension and with a cutting load applied. As shown, the bumper portion 2414 of the bumper drive link 2404 is disposed below the depth gauge 2430 to expose the depth gauge 2430 to the cut. The bumper portion 2432 of the bumper drive link 2406 is disposed at the same height with and without the cutting load applied.

In various embodiments, the saw chain features (e.g., tension-controlled cutting force compensation features) described herein may be used to provide the overall saw chain with power requirements that better fit the power output of the chain saw. For example, the saw chain features described herein may allow a single chain design to be used on a broader power range of chain saws. Additionally, or alternatively, the saw chain features described herein may lessen the required expertise of the chain saw user to apply the exact feed load needed to maximize the cutting speed without stalling the chain saw.

Figure 25:
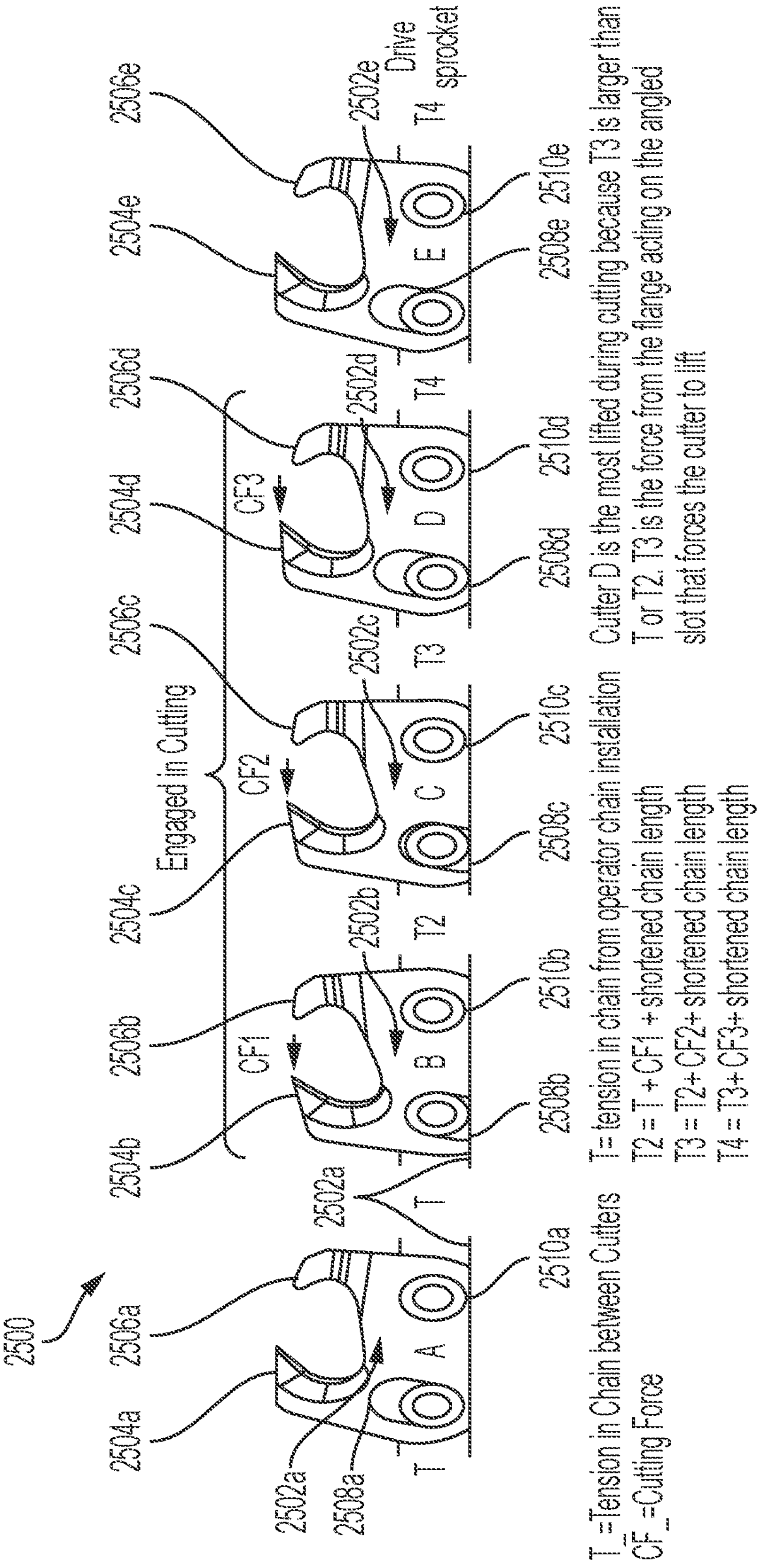
FIG. 25 illustrates a front view of a saw chain including cutter drive links and shows tension and cutting forces that are applied to the cutter drive links, in accordance with various embodiments.

FIG. 25 shows a series of cutter drive links that may be coupled to one another in sequence (e.g., by tie straps (not shown)). FIG. 25 illustrates how the forces acting on a following cutter drive link will affect a leading cutter drive link due to the increased chain tension created by the following cutter drive link and a chain-tension-compensating feature acting on the leading cutter drive link. Although illustrated with respect to cutter drive links, FIG. 25 may broadly represent how the forces acting on a following component will affect a leading component due to the increased chain tension created by the following component and a chain-tension-compensating feature on the leading component.

In various embodiments, initial tension in the chain is applied by the chain saw user, after the chain is placed on the guide bar and drive sprocket, by an adjusting screw on the chainsaw that moves the guide bar away from the drive sprocket. Additional chain tension may be added between the drive sprocket and chain components in contact with the wood while the chain saw is operating.

FIG. 25 shows a saw chain 2500 with cutter drive links 2502*a-e* that include a respective cutting element 2504*a-e*, depth gauge 2506*a-e*, oversized rivet hole 2508*a-e* and normal rivet hole 2810*a-e*. The oversized rivet hole 2508*a-e* may be an angled slot, as shown. FIG. 25 further illustrates tensions T, T2, T3, and T4 that act between adjacent cutter drive links 2502*a-e* as shown. Cutter drive links 2502*a* and 2502*e* are shown in FIG. 25 while they are not engaged in cutting and cutter drive links 2502*b-d* are shown in FIG. 25 while they are engaged in cutting (e.g., cutting wood). FIG. 25 further illustrates the cutting forces CF1, CF2, and CF3 that are applied to the cutter drive links 2502*b-d*, respectively.

In various embodiments, cutter drive link 2502*a* has its cutting element 2504*a* at full height (e.g., relative to the depth gauge 2506*a* and/or the guide bar 2512) because of the lifting action of the chain tension and no downward force acting on the cutter drive link 2502*a*. The cutting element 2504*b* of cutter drive link 2502*b* has moved to the lowest point (e.g., least cutting position) since the chain tension (T) is low acting on the angled slot of the oversized rivet hole 2508*b* and there is a downward force from the wood being cut. The cutting element 2504*c* of the cutter drive link 2502*c* is raised higher than the cutting element 2504*b* of the cutter drive link 2502*b* due to the increased chain tension (T2) caused by the cutting force (CF1) on the cutter drive link 2502*b* and shortened chain length from the cutting element 2504*b* being at its lowest point. Additionally, the cutting element 2504*d* of cutter drive link 2502*d* is higher than the cutting elements 2504*b* and 2504*c* because of the added cutting forces and shortened chain lengths associated with the cutter drive links 2502*b* and 2502*c* that act on the angled slot of the oversized rivet hole 2508*d* of the cutter drive link 2502*d* and lift the cutting element 2504*d* higher against the downward force of the contacting wood.

In general, a cutter drive link with a cutting element that is at a greater height will cut more wood and also have an increased associated cutting force than a cutter drive link with a cutting element that is at a lower height.

The tension in the saw chain associated with cutting wood may continue to increase between the components in contact with the wood and the drive sprocket until the operating chain saw motor cannot generate additional pulling force to support a higher load associated with cutting more wood. At this point, the forces required by the saw chain to cut wood are balanced by the motor. The height of the cutter elements will vary so that the cutting forces meet the pull of the chain saw motor. Unlike conventional cutters that cannot change their cutting forces, some of the cutter drive links with tension-controlled cutting-force-compensating features (e.g., the oversized rivet holes 2508*a-d* of the cutter drive links 2502*a-d*) will have their cutting elements lower than others, thereby reducing their required cutting forces so as to compensate for the available power from the chain saw.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A saw chain for a chain saw, the saw chain comprising:
- a drive link including:
  - a body;
  - a first rivet hole through the body; and
  - a second rivet hole through the body;
- a tie strap adjacent the drive link; and
- a rivet coupled to the tie strap, the rivet including a flange disposed in the first rivet hole, wherein a clearance between the flange and the first rivet hole is 0.010 inches or more, wherein the drive link is a bi-directional cutter drive link that includes:
  - a first cutting element extending upward from the body, the first cutting element configured to perform cuts when the drive link travels in a first direction with the first rivet hole in front of the second rivet hole; and
  - a second cutting element extending upward from the body, the second cutting element configured to perform cuts when the drive link travels in a second direction with the first rivet hole behind the second rivet hole.

2. The saw chain of claim 1, further comprising
- a first depth gauge extending upward from the body and disposed in the first direction from the first cutting element; and
- a second depth gauge extending upward from the body and disposed in the second direction from the second cutting element.

3. The saw chain of claim 1, wherein the rivet is a first rivet, and wherein the saw chain further includes a second rivet including a second flange disposed in the second rivet hole, wherein a clearance between the second flange and the second rivet hole is 0.010 inches or more.

4. The saw chain of claim 1, wherein the clearance between the flange and the first rivet hole and a difference in shape of the flange relative to the first rivet hole enables a distance between the flange and the first cutting element to increase when the drive link travels in the first direction and decrease when the drive link travels in the second direction.

5. The saw chain of claim 4, further comprising an additional rivet disposed in the second rivet hole, wherein a clearance between the additional rivet and the second rivet hole enables a distance between the additional rivet and the second cutting element to increase when the drive link travels in the second direction and decrease when the drive link travels in the first direction.

6. The saw chain of claim 1, further comprising an additional rivet disposed in the second rivet hole, wherein a second clearance between the additional rivet and the second rivet hole is sufficiently large to enable translation of the second cutting element relative to the additional rivet.

7. The saw chain of claim 1, wherein the flange is-non-circular.

8. A bi-directional cutter drive link for use with a chain saw, comprising:
- a body including a first rivet hole through the body and a second rivet hole through the body;
- a first cutting element extending upward from the body, the first cutting element to perform cuts when the drive link travels in a first direction with the first rivet hole in front of the second rivet hole; and
- a second cutting element extending upward from the body, the second cutting element to perform cuts when the drive link travels in a second direction with the first rivet hole behind the second rivet hole;
- wherein the first rivet hole and second rivet hole have elongated shapes enabling rivet translation within the first rivet hole and the second rivet hole such that:
  - the first cutting element extends above the second cutting element when the drive link travels in the first direction; and
  - the second cutting element extends above the first cutting element when the drive link travels in the second direction.

9. The bi-directional cutter drive link of claim 8, further comprising
- a first depth gauge extending upward from the body and disposed in the first direction from the first cutting element; and a second depth gauge extending upward from the body and disposed in the second direction from the second cutting element;

wherein a longitudinal position of the first rivet hole is between the first depth gauge and the first cutting element and a longitudinal position of the second rivet hole is between the second rivet hole and the second depth gauge.

10. The bi-directional cutter drive link of claim 9, wherein the first and second cutting elements are disposed between the first and second depth gauges.

11. The bi-directional cutter drive link of claim 8, wherein the first rivet hole and the second rivet hole are non-circular slots.

12. The bi-directional cutter drive link of claim 11, wherein the first rivet hole comprises side walls and end walls, wherein the side walls are less curved than the end walls, the first rivet hole thereby defining a movement axis for the rivet translation.

13. The bi-directional cutter drive link of claim 8, wherein the first cutting element twists such that a tip of the first cutting element is out of a plane of the body of bi-directional cutter drive link.

14. A saw chain, comprising:

a bi-directional cutter drive link, comprising:

a body including a first rivet hole through the body and a second rivet hole through the body;

a first cutting element extending upward from the body, the first cutting element adapted to perform cuts when the drive link travels in a first direction with, in relation to the first direction, the first rivet hole being positioned in front of the second rivet hole; and a second cutting element extending upward from the body, the second cutting element adapted to perform cuts when the drive link travels in a second direction with, in relation to the second direction, the first rivet hole being positioned behind the second rivet hole;

a tie strap; and a rivet coupled to the tie strap, the rivet including a flange disposed in the first rivet hole;

wherein the flange is shaped differently than the first rivet hole such that:

the first cutting element extends above the second cutting element when the drive link travels in the first direction; and the second cutting element extends above the first cutting element when the drive link travels in the second direction.

15. The saw chain of claim 14, wherein the rivet is a first rivet, and wherein the saw chain further includes a second rivet including a second flange disposed in the second rivet hole, wherein a clearance between the second flange and the second rivet hole is 0.010 inches or more.

16. The saw chain of claim 15, wherein the first and second rivets are integrated with the tie strap.

17. The saw chain of claim 14, wherein a distance between the first cutting element and the rivet increases when the drive link travels in the first direction and decreases when the drive link travels in the second direction as a result of a diameter of the first rivet hole being at least ten percent larger than a diameter of the rivet.

18. The saw chain of claim 14, further comprising a second rivet including a second flange disposed in the second rivet hole, wherein:

a first distance between the first cutting element and the rivet increases when the drive link travels in the first direction and decreases when the drive link travels in the second direction; and a second distance between the second cutting element and the second rivet increases when the drive link travels in the second direction and decreases when the drive link travels in the first direction.

19. The saw chain of claim 14, wherein a clearance between the flange and the first rivet hole is 0.010 inches or more.

* * * * *